(12) United States Patent
Al-Kofahi et al.

(10) Patent No.: US 9,218,344 B2
(45) Date of Patent: Dec. 22, 2015

(54) SYSTEMS, METHODS, AND SOFTWARE FOR PROCESSING, PRESENTING, AND RECOMMENDING CITATIONS

(75) Inventors: Khalid Al-Kofahi, Rosemount, MN (US); Charles Macomber, Minneapolis, MN (US); Jason Rollins, Philadelphia, PA (US); Ellen Rotenberg, Philadelphia, PA (US); Christine Killian, St. Paul, MN (US)

(73) Assignee: Thomson Reuters Global Resources (CH)

( * ) Notice: Subject to any disclaimer, the term of this patent is extended or adjusted under 35 U.S.C. 154(b) by 72 days.

(21) Appl. No.: 13/539,280

(22) Filed: Jun. 29, 2012

(65) Prior Publication Data

US 2014/0006424 A1    Jan. 2, 2014

(51) Int. Cl.
*G06F 17/30* (2006.01)
*G06F 17/00* (2006.01)
*G06F 17/27* (2006.01)
*G06F 17/24* (2006.01)

(52) U.S. Cl.
CPC .............. *G06F 17/30* (2013.01); *G06F 17/241* (2013.01); *G06F 17/27* (2013.01)

(58) Field of Classification Search
CPC ................... G06F 17/30864; G06F 17/30946; G06F 17/30539; G06F 17/30716; G06F 17/27; G06F 17/30; G06F 17/241; G06F 17/3064; G06F 17/30728; G06Q 10/10
USPC ......... 707/726, 727, 728, 729, 732, 749, 753, 707/754, 757, 767, 766, 805, 784, 933, 934, 707/804; 715/205, 225, 230, 231, 232, 234, 715/235, 241, 249, 253, 255, 266, 731, 254, 715/256; 709/224
See application file for complete search history.

(56) References Cited

U.S. PATENT DOCUMENTS

| | | | | |
|---|---|---|---|---|
| 8,326,860 | B2* | 12/2012 | Vailaya et al. | 707/767 |
| 8,479,094 | B2* | 7/2013 | Fouts | 715/271 |
| 8,694,491 | B2* | 4/2014 | Jeh et al. | 707/722 |
| 2002/0091713 | A1* | 7/2002 | Walker | 707/200 |
| 2009/0150388 | A1* | 6/2009 | Roseman et al. | 707/5 |
| 2011/0060761 | A1* | 3/2011 | Fouts | 707/770 |
| 2012/0036157 | A1* | 2/2012 | Rolle | 707/776 |
| 2013/0151607 | A1* | 6/2013 | Faller et al. | 709/204 |

* cited by examiner

*Primary Examiner* — Greta Robinson
(74) *Attorney, Agent, or Firm* — Valenti, Hanley & Robinson, PLLC; Kevin T. Duncan

(57) ABSTRACT

The present invention provides systems, methods, and software for automatically processing data included in a document and identifying and recommending citations matching the processed data. The system allows a user to select and submit text segment(s) for analysis and to select from a set of recommended citations a citation(s) that matches the text segment as well as profile data for inclusion in the document. One or more citation libraries or authority databases are queried to find citations for recommendation which best match the text segment selected and submitted by the author. The system automatically processes data submitted by an author to generate a set of recommended citations for consideration and for inclusion within a document while the document is presented by a document rendering application. A selected citation is then formatted and inserted in the document.

54 Claims, 15 Drawing Sheets

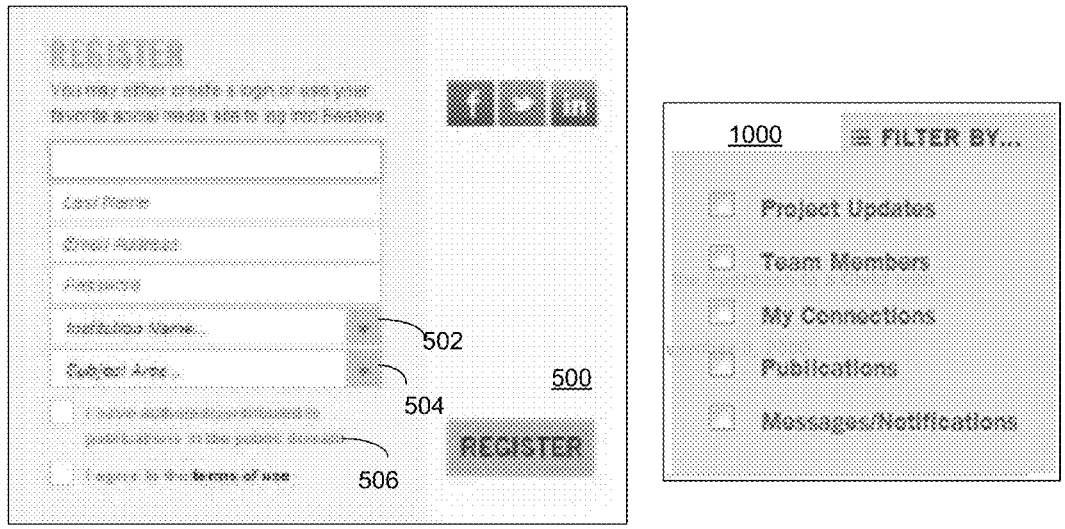
FIGURE 5
FIGURE 10
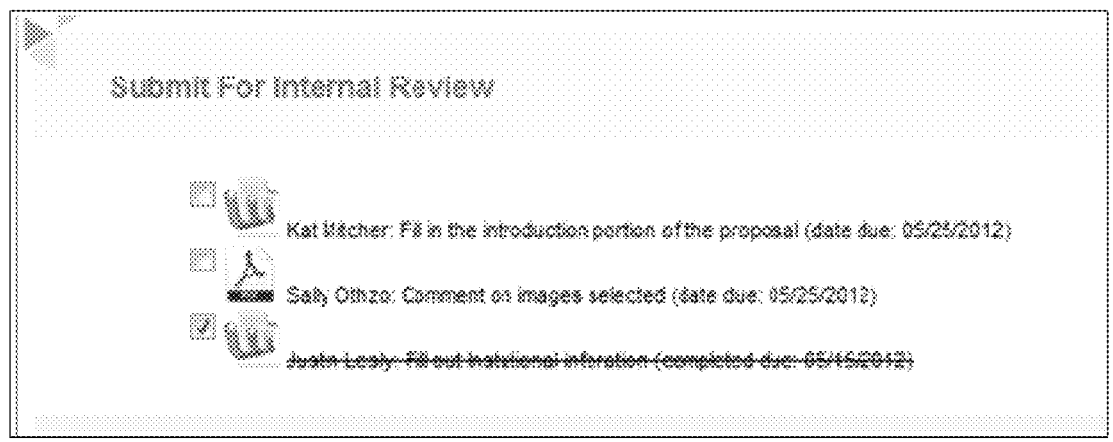
FIGURE 11

SYSTEMS, METHODS, AND SOFTWARE FOR PROCESSING, PRESENTING, AND RECOMMENDING CITATIONS

FIELD OF THE INVENTION

The field of the invention relates generally to document processing and more particularly to systems, methods, and software for dynamically processing data, particularly text segments, and identifying and recommending citation data, particularly literary citations, for presentation to a user and for selectively including citation data within a document rendering application, such as a word processor. The invention further relates generally to information science and infometrics (or informetrics) and more particularly to the fields of bibliometrics and scientometrics.

BACKGROUND OF THE INVENTION

With the advents of the printing press, typeset, typewriting machines, and computer-implemented word processing and storage, the amount of information generated by mankind has risen dramatically and with an ever quickening pace. As a result there is a continuing and growing need to accurately collect and store, identify, track, classify and catalogue for retrieval and distribution this growing sea of information.

In the area of scholarly and scientific research and writing a sophisticated process and convention for documenting research, supporting materials and organizing fields of study has emerged called "bibliographic citation." Such scientific writings include, among other things, books, articles published in journals, magazines or other periodicals, manuscripts, and papers presented, submitted and published by society, industry and professional organizations such as in proceedings and transactions publications. To facilitate the widespread distribution of information published in scholarly writings to more efficiently and effectively move bodies of study forward, scholars and scientists use bibliographic citation to recognize the prior work of others, or even themselves, on which advancements set forth in their writings are based. "Citations" or "cited references," as included in any particular work or body of work, is used herein to refer broadly to cited references, bibliographic or other reference data, that collectively form in-text citations, footnotes, endnotes, and bibliographies and are used to identify sources of information relied on or considered by the author and to give the reader a way to confirm accuracy of the content and direction for further study. A "bibliography" may refer to either of a complete or selective list or compilation of writings specific to an author, publisher or given subject, or it may refer to a list or compilation of writings relied on or considered by an author in preparing a particular work, such as a paper, article, book or other informational object.

A citation briefly describes and identifies a cited writing as a source of information or reference to an authority. Citations and bibliographies follow particular formatting conventions to enhance consistency in interpreting the information. Each citation typically includes the following information: full title, author name(s), publication data, including publisher identity, volume, edition and other data, and date and location of publication. Given the formatting requirements and numerous fields associated with each citation and given that there are tens and in some cases hundreds of citations in a given paper, the amount of work required of authors in accurately identifying and citing such a substantial number of citations in a given paper or project presents a substantial problem and burden in the publishing and research processes.

Even when an author or collaborator of a paper or project has cited certain papers in prior documents, there exists the problem of efficiently and accurately recalling such papers for citing in future papers. What is needed is a system that allows an author the ability to work in a word processor environment while providing effective access to citation information without leaving the word processor application.

In addition, many fields in a citation are inherently ambiguous making it very difficult for an author to accurately represent citation in a paper or work in process. For example, recalling the exact title of a paper to be cited or the author of such a paper make the process inherently problematic. Systems presently available to researchers and authors do not provide an effective means to identify and generate citations based on an author's "rough" or approximate citation information or even topical information in the text of a working document.

Also, author names are most usually represented in a citation in an abbreviated form, such as an initial rather than full first or middle names (e.g., J. Smith), or suffer naturally from commonality with other authors, such as having either a common first or last name or both e.g., John Smith. This results in a latent ambiguity as to the actual identity of the author or the paper for which a citation is sought during the authoring process. There have been many attempts to disambiguate author and other citation information. A system and method for disambiguating information is disclosed in U.S. Pat. No. 7,953,724, issued May 31, 2011, entitled Method and System for Disambiguating Information Objects, which is hereby incorporated by reference herein in the entirety.

In support of the pursuits of science and research databases, database management tools, citation management and analysis tools, research authoring tools, and other powerful tools and resources have been used and developed for the beneficial use of scholars, researchers, and scientists. These tools and resources may be available to users in an online environment, over the Internet or some other computer network, and may be in the form of a client-server architecture, central and/or local database, application service provider (ASP), or other environment for effectively communicating and accessing electronic databases and software tools. Examples of such tools and resources are Thomson Reuters Scientific's Web of Science™ (WoS), Web of Knowledge™ (WoK), and ResearchSoft™ suite of publishing solutions including, EndNote™, EndNoteWeb™, Reference Manager™, and Manuscript Central™.

A longstanding problem in the authoring and publication process has been accurately entering citation information in papers during creation and the time consuming and tedious process of manually verifying the accuracy of the citation prior to publication. Small but critical errors, such as incomplete information and incorrect information (e.g., misspellings and typographical errors) cause the author and publisher to lose credibility and cause the reader to waste effort searching for the referenced material incorrectly cited in the document. What is needed is a system that enables authors to identify, select and insert accurate citation information directly into a document while in the word processor application.

One particular aspect of the authoring process that is problematic is when an author desires to present in a paper a technical or other position that is supported by prior research but does not recall the prior paper that supports the statement. Techniques for textual analysis, including those based on natural language processing, IDF (inverse document frequency), TF-IDF (term frequency—inverse document frequency), are known and have been used to help discern meaning out of the text presented and to associate such text with relationships, concepts, and documents based on, for example, a scored relevance. Such techniques may include extraction and sorting, such as parsing of data from sentence or word structures, performed on electronic documents to extract information from papers and citations for further processing.

"Writings," "manuscripts," and "papers," as used herein shall refer to both "hard" documents and "soft" electronic documents and shall be used interchangeably and given the broadest collective meaning. Such works of authorship are now widely created, edited, maintained, archived, catalogued and researched in whole or in part electronically. The Internet and other networks and intranets facilitate electronic distribution of and access to such information. The advent of databases, database management systems and search languages and in particular relational databases, e.g., DB2 and others developed by IBM, Oracle, Sybase, Microsoft and others, has provided powerful research and development tools and environments in which to further advance all areas of science and the study of science. There are companies and institutions that have created electronic databases and associated services, such as WoS and WoK, that are specifically designed to help organize and harness the vast array of knowledge.

Reference validation tools are available within the context of manuscript creation, submission, approval, proofing, and production processes. Many citation or reference databases, which may be referred to herein as authority databases, have become available via web service connections. However, these tools are not presently well integrated with authoring applications and require substantial manual intervention and confirmation. Thousands of papers and manuscripts are submitted to reviewers and publishers daily by authors and many of the submissions include malformed references. To catch and correct these errors, the current path to publication usually includes a manual reference validation step consisting of checks for style and content accuracy. The validation task may be performed by a variety of roles, most commonly by a copy editor or a production editor, but also possibly by a typesetter. With papers and manuscripts commonly containing dozens (or hundreds) of cited references, the validation process is tedious and time-consuming, and adds significant costs to the publication process, having been estimated to account for up to 60% of a publisher's correction and formatting effort. What is needed is a system that effectively identifies and recommends citation data for inclusion by authors in papers, which citations are accurate and uniformly conform to a desired style.

Existing systems are known that provide, e.g., validation of XML tags and schema in a document/citation and that provide enhanced data with document/citation or document/citation records. Such systems may provide cholarly meta data and linking, e.g., separate topical fields, abstract fields, etc, and the creation of a Digital Object Identifier (DOI) or unique digital identifier for a specific scholarly work, for example a URL. DOI may be used to identify content objects in a digital environment. Entities operating over digital networks are assigned DOI "names," and have associated with them "current" information, including address information. Name information does not change but other information, e.g., address, may change over time. A DOI system provides a framework for managing the following: identification, content; metadata, links, and media.

Improved methods, systems, and software for automatically processing literary citations are needed to provided enhance user (author) experience and to more efficiently and effectively facilitate accuracy of inserted citations, as well as identify and recommend for selection a set of recommended citations for inclusion in a document based on a limited set of textual and/or citation data, such as provided by an author within a document.

SUMMARY OF THE INVENTION

The present invention provides systems, methods, and software for automatically processing data (e.g., text segment) included in a document and identifying and recommending citations matching the processed data. The system allows a user (e.g., author) to select and submit text segment(s) for analysis and to select from a set of recommended citations a citation(s) that matches the text segment as well as profile data for inclusion in the document, e.g., as a footnote or an endnote. More particularly, the invention performs this process while the author is creating or editing the document in a document rendering application, e.g., word processor. One or more citation libraries or other authority databases are queried to find citations for possible recommendation which best match the text segment selected and submitted by the author. More particularly, the invention uses a combination of textual analysis and a profile, such as a personal profile, to identify, rank and present the set of recommended citations. A selected citation is then inserted in the document in a properly formatted form or style.

The present invention contemplates a system for automatically processing data submitted by an author to generate a set of recommended citations for consideration of the author and for inclusion within a document while the document is presented by a document rendering application. The system of the present invention may work in combination with an authorship or citation editor or other software application or client residing on the local machine or through an online service, which may include a personal library or bibliography of citations associated with the author or team of authors and which may retrieve a citation that matches a selected text segment, e.g., an incomplete or unformatted citation from a citation library.

The present invention provides enhanced workflow solutions for authors (e.g., researchers, scientists, and scholarly authors) and, indirectly, for publishers (e.g., journals and professional and technical societies) by effectively identifying, recommending and inserting citations from authority database(s) in papers and other submissions for publication or for review. The invention accelerates the time to publish or market papers, journals, meeting abstracts, and conference proceedings and delivers significant productivity gains in the process. The invention enables users to access research and other productivity resources and solutions seamlessly while working in a word processor application. The invention provides value-added information, with software tools and applications that help users to identify and insert appropriate citations more efficiently. Although the invention may be described herein in the context of scientific research, the invention is also applicable in other applications and environments.

In one embodiment, the present invention provides an integrated or integrate-able system of research and authoring productivity software for use in conjunction with databases of interest, e.g., WoS, WoK, CrossRef, and PubMed. The system of the invention may be integrated or used in conjunction with other authoring tools and solutions. By way of example, Thomson Reuters Scientific applications EndNote®, EndNote Web™, Reference Manager®, Abstract Central™, Proceedings Central™, and Manuscript Central™ are commercially available systems that provide solutions used to create, write, publish, submit, and manage bibliographies, papers, publications, and other scholarly pursuits. Many of the functions included in this system of solutions may be automated.

The invention may be used with one or more or a combination of solutions. For example, Manuscript Central provides a web-based, database-driven peer review and online submission solution for scholarly publishers. Manuscript Central automates manuscript submission to journals and allows for easy administrative, editing and reviewing capabilities. EndNote® and Reference Manager® are desktop applications, but may also be browser-based applications, used to publish and manage bibliographies. With these products users, e.g., students writing papers, professionals publishing research, can, for example, do the following: search Internet databases to build personal reference libraries; import references from online and CD-ROM databases and library catalogs; format bibliographies automatically for hundreds of scholarly publications; use Cite While You Write™ feature with Microsoft® Word® to create bibliographies instantly as references are cited. EndNote Web is a Web-based tool for managing and citing references in papers and creating bibliographies. Integrated seamlessly with EndNote desktop and the Web of Knowledge$^{SM}$ research platform, EndNote Web provides an online collaborative environment for existing EndNote users, and an entree for undergraduate students requiring a basic bibliographic solution. In one manner the invention provides a text analysis and visualization tool and works seamlessly with EndNote and Reference Manager to provide a powerful way to explore reference libraries visually for major themes and topics. The invention may be integrated with tools that allow users to quickly evaluate vast amounts of references, accelerating the research process.

As part of the process, a user can select from a list of databases against which the recommendation or suggestion process is to be performed or the system may default to a predefined set of one or more databases. Exemplary databases for use with the present invention include public reference databases; e.g., CrossRef, and PubMed; commercial databases; e.g., Web of Science (WoS), Web of Knowledge (WoK), and BIOSYS; and privately held specialized databases.

The present invention provides the following functional features: a text analysis module; a personal profile module; a recommendation module; and may further include word processor integration module; communication module; source application switching; Microsoft Word citation import; Section bibliographies; Composite citations; Link from citations to bibliography; Generate an organizational group in source reference management application; and Manage references module.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 is a screen shot of a user registration interface in conjunction with the present invention.

FIG. 10 is a screen shot of a results filter interface in conjunction with the present invention.

FIG. 11 is a screen shot of a user project milestone review and submission interface in conjunction with the present invention.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

As described herein, the terms "writing", "manuscript", "paper", and "article" shall be understood to refer to hard and soft documents, papers, writings, and other publications and are all meant to each inherently refer to the other terms as the invention is intended to cover all sorts of publications, papers, writings, articles, letters, editorials, books, chapters, or other kinds of published papers or documents. The terms "text segment" or "set of text" is used broadly to refer to a selected, marked, highlighted, extracted, or otherwise indicated set of textual information, such as alpha-numeric characters, contained or to be contained or related to text appearing in a document, such as a research paper being authored by a researcher.

Figure 1:
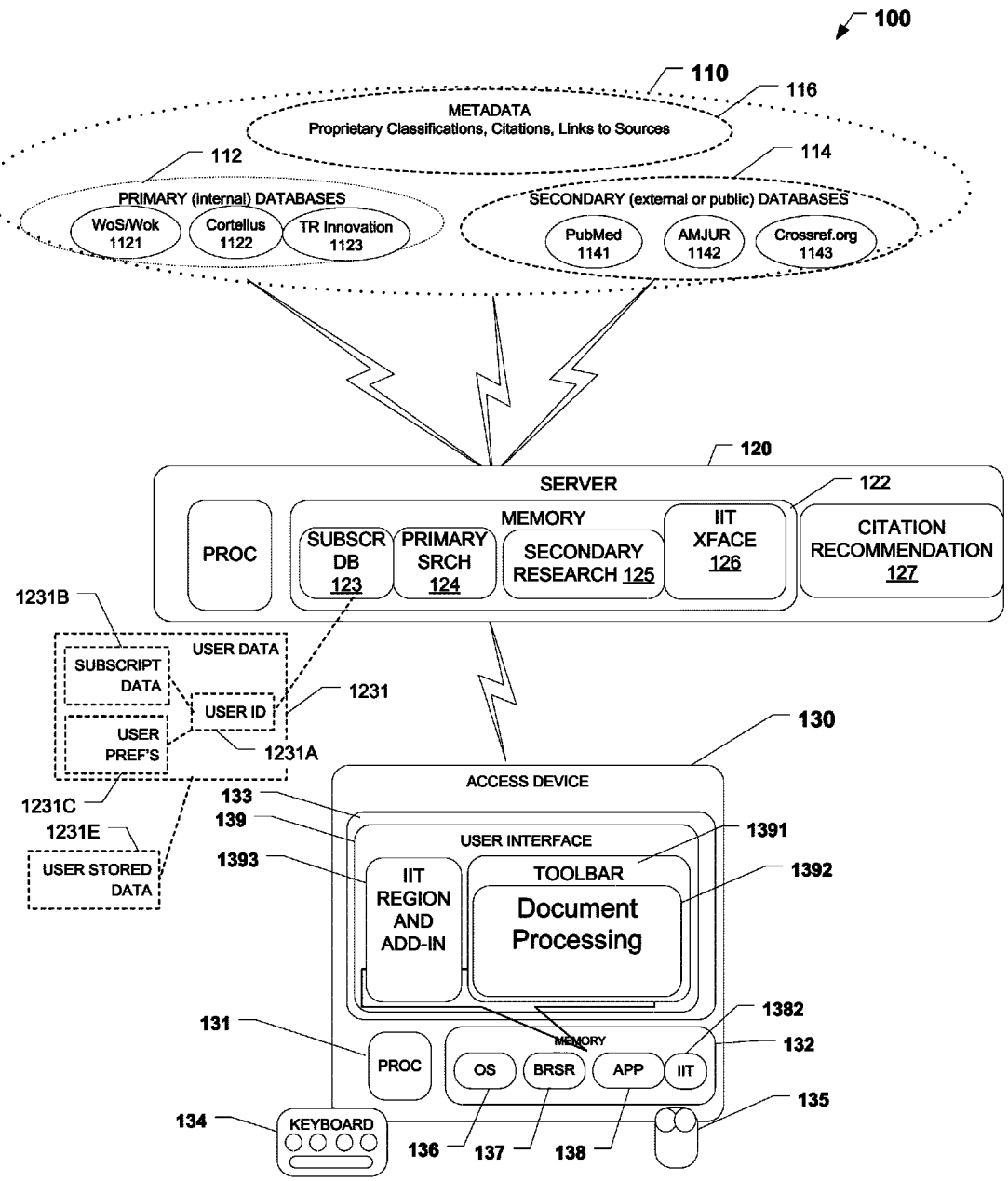
FIG. 1 is a schematic diagram presenting a configuration of hardware and software components according to one embodiment of the present invention.

With reference to the figures, various embodiments of the invention are presented. FIG. 1 is a block diagram presenting one embodiment of a configuration of the hardware and software components comprising the present invention. A general purpose operating system is provided as a framework for storing data and executing applications (such as to render the general purpose computing system a special purpose computing system), as well as policing the flow of input and output information. Exemplary general purpose operating systems are Mac OS from Apple Computer, Inc., Windows from Microsoft Corp., and various distributions of the Linux and UNIX operating systems. The present invention provides, among other things, software platform components that enable an application to perform several functions without leaving the document and the host application. Essentially, the document could become a software platform.

Figure 2:
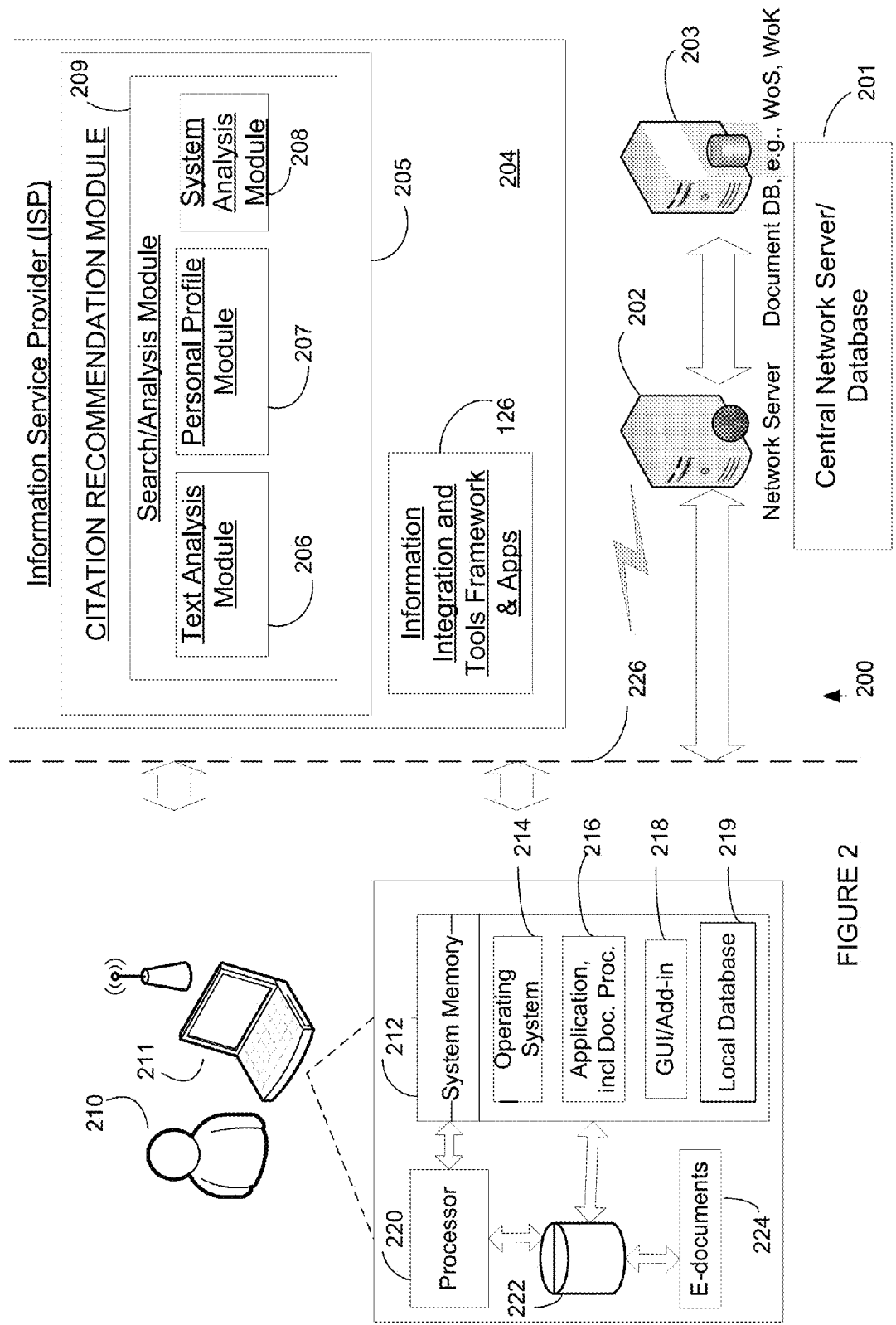
FIG. 2 is a schematic diagram presenting a configuration of hardware and software components according to a second embodiment of the present invention.

In one embodiment, the invention provides a computer-based system including processor, memory, and machine readable code stored in memory and executable by processor for providing a citation recommendation. With reference to FIG. 1, the system 100 is in client-server architecture including a set of databases 110, a server system 120, and a client access device 130. The system 100 includes at server 120 a citation recommendation module 127, although aspects of this module may reside at client access device 130 such as in the form of an add-in or plug-in module integrated with a local word processor application. As shown in FIG. 2, citation recommendation module 127 is illustrated as citation recommendation module (CRM) 205 comprising text analysis module (TAM) 206, personal profile module (PPM) 207 and system analysis module (SAM) 208. The text analysis module, the personal profile module, and the recommendation module include functional components residing and executed on one or more of a local client device and a central server. In operation, a user, such as an author preparing a document via word processor application operating on access device 130, identifies, marks, highlights or otherwise selects a portion of text or "text segment" from within the document. A signal received from the client device represents the selected text segment and is communicated to the citation recommendation system 127, 205. TAM 206 performs processes, such as natural language algorithms, heuristics, statistical modeling or weighting, idf, tf-idf, co-occurrence probability, latent semantic indexing, and other processes, on the received text segment and generates a first output. For example, if statistics show that certain references identified as relevant to a selected text segment are often cited ("popular") then they are ranked higher as being more likely to be relevant based on prior authors selecting this reference for citing in their papers in the past. This may be ranked even higher in the event the reference is associated more closely with the area of research associated with the paper in process or the author, such as by the PPM.

The TAM output may take the form of a set of potential or candidate citation references or documents or other form of data representation of possible citations for recommending to the user. Examples of text analysis techniques that may be applied in this operation are described, for example, in U.S. Published Application 2008/0033929 (Al-Kofahi et al.) entitled SYSTEMS, METHODS, AND SOFTWARE FOR IDENTIFYING RELEVANT LEGAL DOCUMENTS, and in U.S. Published Application 2009/0198674 entitled INFORMATION RETRIEVAL SYSTEMS, METHODS, AND SOFTWARE WITH CONCEPT BASED-SEARCHING AND RANKING, both of which are incorporated by reference herein in the entirety. Techniques related to textual analysis may include as a pre-processing function clustering of documents into logical groups as described, for example, in U.S. Published Application 2010/0332520 (Lu et al.) entitled SYSTEMS, METHODS, AND INTERFACES FOR EXTENDING LEGAL SEARCH RESULTS, which is incorporated by reference herein in the entirety. In conjunction with the present invention the clustering may be performed with consideration given to the field of research of the user based on the personal profile. Accordingly, the output of TAM may be influenced by the PPM and the CRM may then further refine the results of TAM with the data associated with a personal profile.

Personal profile module 207 receives or accesses information associated with a user or a group of users, e.g., collaborators on a project or paper, and generates a second output or further processes the output of the TAM. For instance, where the output of the TAM 206 is a set of candidate citations or documents, the PPM 207 may re-rank, filter or supplement the set based on user profile data. For instance, citations included in prior papers authored by the author, or a field of research associated with the author or other criteria may be used to generate an output, which output may be the resulting modification to the TAM output. For example, the set of results from TAM may include citations identified as in a field of research associated with the user, citations identified as outside the field of research associated with the user, and citations identified as in a related field of research. The CRM 204 processes the TAM and PPM outputs to arrive at a set of recommended citations for presenting to the user. The citation recommendation module is responsive to the first output of the TAM and the second output of the PPM and generates a set of citation recommendation data.

The personal profile module associates a personal profile record with a first user and receives or accesses information relating to at least one of the following: a set of first user publications; a set of first user search terms; a set of grants or similar funding sources; a set of first user search results or saved queries; a set of items stored in a personal reference library associated with the first user; a set of stored history of user-system interactions associated with the first user; a set of personal or professional biographical data elements of the first user; and a set of personal or professional biographical data elements of other system users associated or connected with the first user. The second output of the PPM may take the form of one or more of the following: a list of one or more recommended references or citations from a user's personal reference library; a list of one or more recommended references or citations from at least one authority database; a list of one or more recommended references or citations from other system user's personal reference libraries, or data representations of these items.

In one manner of implementation, the PPM output and the output of the TAM delivered to and processed by the citation recommendation module to generate a final set of citation recommendation data, which then may be delivered for presentation to a user. In another manner of implementation, the PPM may receive or modify the output of the TAM so as to rank, re-rank, filter, supplement or otherwise adjust the output to reflect aspects of the personal profile associated with a user in the final set of recommended citation data. The output of the PPM may then be delivered to and processed by the citation recommendation module to generate a final set of citation recommendation data, which then may be delivered for presentation to a user. In this manner the data processing flow follows essentially a serial path through the citation recommendation process. For instance, the TAM may generate a first set of candidate citations or references or documents and the PPM may rank, re-rank or filter that set based on personal profile associated with the user to generate a revised or modified set of candidate records, which are then further processed by the CRM to yield a set of citation recommendation data. In a further variation, the PPM may include data or filter criteria that are delivered to the TAM for consideration in arriving at the first output, the PPM may generate a further second output with both outputs delivered to the CRM.

The citation recommendation module may generate at least one of the following: a list of one or more recommended references or reference citations; a list of one or more recommended search results or saved queries; a system response requesting input from the user. The set of citation recommendation data, which in one manner includes at least one citation, is communicated to a client device 130 (FIG. 1) or 211 (FIG. 2) for processing the set of citation recommendation data and for presenting for display a representation of the at least one citation. For instance, the presented set of citation recommendation data may be in the form of a GUI including a list of recommended citations from which the user selects a desired citation for inclusion in the document being worked on. The system receives a signal from the client device, the signal including a selection associated with the set of citation recommendation data.

The client device 130 operates under a user account associated with a personal profile record and the personal profile module recognizes the user account and generates the second output based at least in part on data contained in the personal profile record. The personal profile module may be used to monitor user interaction and to store usage related data and for associating usage related data with a particular user and this usage data may be used in generating the second output or in modifying the TAM output. A word processing integration module may be included to integrate the text analysis module, the personal profile module, and the recommendation module with a word processor application. The word processing integration module may be in the form of an add-in or a plug-in module for installation on a local client processing device. An activation module may be used for initiating operation of the plug-in module.

The local client processing device presents graphical user interfaces associated with operation of the invention, which interfaces comprise user selection elements to handle user selection associated with the set of citation recommendation data. Through the add-in, the word processor application operating on the local client processing device processes received user selections. Based on a user selection, the add-in automatically includes a selected recommended citation into a document operated by the word processor.

The system may include an authority database module adapted to interface with a set of at least one authority database. The set of at least one authority database for example includes one or more of the following: a set of full-text files; a set of meta-data records; a set of links connecting database elements; a set of links to external source databases. The set of at least one authority database includes at least one of the following databases: Web of Science, Web of Knowledge, National Library of Medicine PubMed, CrossRef, BIOSIS, Dialog, library OPACS, Medline, ProQuest, Ovid, Ebsco, WilsonWeb, ResearchGate and journal-configured external database. The system may present a user interface and receive an input representing a user selection of one or more authority database for searching based on text analysis. The selection of databases may result in full-text searching and/or in meta-data or pseudo-document or surrogate searching.

A communication or an electronic mail module communicates the citation recommendation data to a destination application. A tool integration module integrates with at least one reference tool to receive citation data pertaining to at least one citation from the at least one reference tool, the set of citation recommendation including at least some data from the received citation data.

Citation Loci Search

One application of the present invention is described as follows. When an author of a scholarly journal article or academic researcher is writing a new paper, a search for citable references usually involves a survey of known authors and journals, a title search, a literature search, and a survey of professional societies and university repositories. The Citation Recommendation System helps authors find prior relevant work. Implementation of the CRM may involve citation networks, corpus statistics, text mining to extract key words and terms of art, etc.

One method that is of particular interest utilizes citation loci or referencing text around incoming citations (see examples below). For instance, this approach may be used in a product for the legal domain that recommends case citations to attorneys as they are drafting briefs. The basic idea is that while a paper may contain several topics or findings, it is often cited for only a subset of these topics. The set of referencing text (or citation loci) represents the reasons why a community of authors cites a paper. It captures their collective judgment why a paper is important. An added benefit to searching citation loci is that it can alleviate the impact of query-document term mismatch.

The utility of citation loci in finding relevant citations represents a manner of searching referencing text as opposed to full text and may be used as an alternative to full text search as well as an extension of full text search. The citation locus for a document is ideally the body of all citing text referring to that document. For example, consider an article that has been cited as shown in the following excerpts 1-3 as citation [3] with preceding sentence as the text directly related to that reference shown in italics:

Excerpt 1—"The envelope of ODV is not well characterized; and although it may be composed of multiple proteins, the mechanism by which it facilitates the initiation of infection of insect midgut cells is unclear [reviewed in [2]]. *In contrast, BV envelopes contain an envelope fusion protein that causes the merging of the virion envelope and the membrane of cellular endocytic vesicles when exposed to low pH. Current evidence suggests that lepidopteran baculoviruses may be divided into two phylogenetic groups based on the envelope fusion proteins of budded virions* [3]. One group that includes *Autographa californica* multinucleocapsid nucleopolyhedrovirus (AcMNPV) and *Orgyia pseudotsugata* MNPV (OpMNPV), contain GP64 in their budded virion envelopes [4,5]."

Excerpt 2—"Homologs of ld130 are found in the genomes of all the sequenced gp64-minus viruses including LdMNPV, SeMNPV [8]. *Plutella xylostella* GV (PxGV) [9] and Xestia c-nigrum GV (XcGV) [10]. In addition, homologs of ld130 are also found in gp64-containing viruses, although they do not appear to be capable of mediating low-pH-dependent membrane fusion (Pearson et al, unpublished). In contrast to the close relatedness of baculovirus gp64 homologs, the LD130 homologs are highly variable suggesting that gp64 was recently incorporated into a baculovirus genome where it displaced the envelope fusion function of the ld130 homologs

[3]. Database searches with LD130 and its homologs routinely identify, not only homologous baculovirus proteins, [ . . . ]"

Excerpt 3—"Recently a number of complete baculovirus genome sequences have been described and were found to lack an open reading frame with homology to gp64. Analysis of the genome of the *Lymantria* disparMNPV (LdMNPV), revealed a single on (ld130) with predicted signal and transmembrane domains. Characterization of LD130, indicated that it localizes to the membrane of infected cells, is a component of budded virions, and is N-glycosylated. Uninfected cells transiently transfected with a plasmid encoding LD130, showed localization of the protein to the cell membrane and low-pH mediated cell fusion suggesting that LD130 is the envelope fusion protein of LdMNPV [3].

Defining, for example, the citation locus to be the sentence preceding the citation, the citation loci for citation [3] from this set of three reference documents would be as follows: "Current evidence suggests that lepidopteran baculoviruses may be divided into two phylogenetic groups based on the envelope fusion proteins of budded virions. / In contrast to the close relatedness of baculovirus gp64 homologs, the LD130 homologs are highly variable suggesting that gp64 was recently incorporated into a baculovirus genome where it displaced the envelope fusion function of the ld130 homologs. / Uninfected cells transiently transfected with a plasmid encoding LD130, showed localization of the protein to the cell membrane and low-pH mediated cell fusion suggesting that LD130 is the envelope fusion protein of LdMNPV." In this manner, rather than searching the full text of article [3], the search is based on text in other articles related to the referencing text related to the citation of article [3] in other papers. In essence, searching a "pseudo-document" or "surrogate" document concatenated from referencing text to arrive at a match or recommendation. As an alternative, the text following the citation loci, while intuitively less likely to be relevant that the preceding text, may be also considered in this process. The particular implementation of citation loci search for scholarly articles may be refined based on tested effectiveness.

Techniques associated with this type of referencing text search and integration with local word processing application is discussed in U.S. Published Application No. 2012/0036125, entitled METHOD AND SYSTEM FOR INTEGRATING WEB-BASED SYSTEMS WITH LOCAL DOCUMENT PROCESSING APPLICATIONS, the contents of which is hereby incorporated by reference in the entirety herein.

In one manner of operation, a pre-processing of one or more corpus of documents yields a search collection based on citation loci referencing text. The one or more corpus may be selected based on domain or field of interest. For instance, using the BioMed Central open access full-text corpus for text mining research. The corpus consists of roughly 120,000 articles of peer-reviewed research articles in the biomedical domain.

Citation Loci Collection—To build the citation loci search collection, the pre-processing traverses the BioMed Central corpus text. When a citation to a document is found, the search database saves the citing text for the document. The result of traversing of the entire corpus will be a new document containing all citing text in BioMed Central for each document that has at least one citation in the corpus. In this manner the referencing text is concatenated to yield the citation loci search corpus.

To test the effectiveness of this approach, a standard full text search may be performed on the original corpus and compared against a citation loci search performed on the citation loci corpus using the same set of queries. The results may be evaluated to determine the effectiveness of searching citation loci and to determine modifications to the technique. In one example, start with defining a citation locus as a set number of words or other delimiter (such as preceding sentence) that occur before the citation. Selecting and reviewing, e.g., several hundred examples of such loci at random may lead to modifying the definition of a citation locus (i.e., number and location of words) to improve effectiveness. The effectiveness of this technique may vary and depend on the nature of the original corpus and the subject field of interest. The citation loci collection may be loaded for processing on a search platform, e.g., Thomson Reuters Novus search platform, aspects of which are described in U.S. Published Application No. US 2005/0004898, entitled DISTRIBUTED SEARCH METHODS ARCHITECTURES, SYSTEMS, AND SOFTWARE, the contents of which are incorporated by reference herein in the entirety.

In addition to full-text and citation loci search, alternative text analysis may include collaborative filtering (e.g., for authors and papers), citation networks (e.g., co-citations), corpus statistics (e.g., citation priors for a particular paper, author, institution, author to author relationships, co-authorship, etc), document structure (e.g., literature review vs method description), citation relevancy to a document, author profiles (terms of arts associated with an author), text mining to identify terms of art, etc.

FIG. 1 shows an exemplary Integrated System 100 comprising an online information-retrieval and analysis system adapted to integrate with a document processing system, such as a native operating system or a locally operated word processor residing at a client device. In this exemplary embodiment, System 100 includes at least one web server 120 that can automatically control one or more aspects of an augmented document-processing application on a client access device 130. The document-processing application 1392, for example, the Microsoft word application, is augmented with an add-on framework 1393 that integrates into the graphical user interface of the application and includes a browser control that can access one or more web-based applications and allow macro-type scripts of the web-based applications or services control the document processing application. System 100 includes one or more databases 110, one or more servers 120, and one or more access devices 130.

Databases 110 includes a set of primary databases (PDC) 112, a set of secondary databases (RTC) 114, and a set of metadata databases 116 and that represent resources relied on by users, such as researchers, students, doctors, lawyers and other professionals. Primary databases 112, in the exemplary embodiment, may be proprietary, subscription-based, or internal to a service provider, such as the Thomson Reuters Corporation, and for example include a Wos/WoK database 1121, Cortellus 1122 and a TR Innovation database(s) 1123. Secondary databases 114, which may be external or public, represent further resources of interest to a group of users and may supplement authorities to those offered by the primary database. In this example the secondary databases include PubMed database, 1141, an AMJUR database 1142, and a Crossref.org database 1143. Metadata databases 116 include, for instance, citation relationships, abstracts, links, classification data, and other source data. Embodiments may include databases that include legal, research, financial, scientific, or health-care information.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, and a user-interface module 126. Processor module 121 includes one or more local or distributed processors, controllers, or virtual machines. In the exemplary embodiment, processor module 121 assumes any convenient or desirable form. Memory module 122, which takes the exemplary form of one or more electronic, magnetic, or optical data-storage devices, stores subscriber database 123, primary search module 124, secondary search module 125, and user-interface module 126.

With respect to the present invention, a citation search and recommendation module 127 includes executable code, either executed in whole or in part at either of server 120 and or client access device 130, adapted to perform text analysis on a set of selected text received from a document and to perform analysis on a personal profile (such as a record) related to an individual user or group of collaborators to arrive at a set of recommended citations from which a citation may be selected for insertion in a working document, such as a research paper for submission for publishing in a journal. This functionality is discussed in detail hereinbelow.

Subscriber database 123 includes subscriber-related data for controlling, administering, and managing pay-as-you-go or subscription-based access of databases 110. In the exemplary embodiment, subscriber database 123 includes one or more user preference (or more generally user) data structures. In the exemplary embodiment, one or more aspects of the user data structure relate to user customization of various search and interface options. To this end, some embodiments include user profile information such as biographical information, institution association (e.g., university, corporation, society, etc.), area of practice or study or research (e.g., asthma, allergy), and prior publications. User data (1231A-E) may be used to authenticate user credentials and grant access to subscriber-based resources or work spaces. For seamless access across multiple platforms and/or services or resources an integrated credentialing service may be used, e.g., Thomson Reuters' OnePass solution.

Primary search module 124 includes one or more search engines and related user-interface components, for receiving and processing data against one or more of databases 110. In the exemplary embodiment, one or more search engines associated with search module 124 provide Boolean, tf-idf, natural-language analysis capabilities. Secondary module 125 includes one or more search engines for processing data against one or more of databases 114.

Information-integration-tools (IIT) framework module 126 (or software framework or platform) includes machine readable and/or executable instruction sets for wholly or partly defining software and related user interfaces having one or more portions thereof that integrate or cooperate with one or more document-processing applications. Exemplary document-processing (or document-authoring or -editing) applications include word processing applications, email applications, presentation applications, and spreadsheet applications. In the exemplary embodiment, these applications would be hosted on one or more accesses devices, e.g., device 130.

Access device 130 may take the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135. Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, application software 138, including document processing software. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. In the exemplary embodiment, document processing software 138 includes one or more word processing applications, e.g., Microsoft Word processing software, Powerpoint presentation software, Excel spreadsheet software, and Outlook email software. Document processing software 1392 may integrated with information-integration tools, which may be, for example, downloaded from server 120 via a wired or wireless communication link established with, for example, an ISP. Upon launching of the document processing software an integrated document-processing and information-retrieval graphical-user interface 139 is defined in memory 132 and rendered on display 133. Upon rendering, interface 139 presents data in association with one or more interactive control features (or user-interface elements). In the exemplary embodiment, each of these control features takes the form of a hyperlink or other browser-compatible command input. User selection of some control features results in retrieval and display of at least a portion of the corresponding document within a region of interface 139. Regions may be simultaneously displayed or at separate times.

Interface 139 includes document-processing tool bar region 1391, document-processing (editing and display) region 1392, and integrated information region(s) 1393. In the exemplary embodiment, region 1393 includes control and display elements for external content and services, such as a listing of one, two, or more web apps (or locally supported apps) provided by server 120 and databases 110, specifically the web apps and framework components of module 126. Region 1393 includes control and display elements for metadata content related to completing a task related to authoring a document loaded into document-processing (active editing) window 1392. In some embodiments, region 1393 takes the form of a user dashboard and includes specific workflow information and control elements related to the user who launched the document-processing application and/or generic workflow information accessible via the user. In some embodiment, the user may select a workflow step or task within region 1393 and initiate update of the content or available tools and services of module 126.

Also, in the exemplary embodiment, the information integration tools include local desktop tools. These tools may be made available through an exemplary software platform or framework of module 126 from server 120. As discussed in more detail below, one or more portions of tools, APIs and software are downloaded and installed as an add-on or add-in framework and set of associated APIs to host application 138. In the exemplary embodiment the framework generally allows for building applications that operate in a user desktop workflow scenario. The exemplary framework or platform can be broken down into the following layers or silos. Hooks: Mechanism in the host application, such as a toolbar button in MS Word word processing application to invoke the container. Container: The area, such as a command bar object in MS Word application, where the feature applications are hosted. Applications: Feature applications that support a specific set of features. Service Blocks: Infrastructure pieces that feature applications can leverage.

A hook, in the exemplary embodiment, is designed as a mechanism for users to open the container from a host application. The hook loads itself inside that host application and then loads the container. A hook also introduces a uniform way to see the content. The hook, through the use of application programming interfaces (APIs), provides a way to get at, extract, and/or insert data of the particular opened document within the host application. A host application could be any Microsoft desktop application, WordPerfect, Adobe Professional, or a web browser (e.g., Internet Explorer, Netscape, FireFox, etc.). In one example, the host application is Microsoft Word. The exemplary embodiment provides single add-in for all supported Word versions. One way of achieving this support is to add an abstraction layer based on the use of reflection into the version specific library to allow the same code to work for all versions of Word. The abstraction layer is based on the most recent version, and falls back on earlier supported method calls if needed. It also fails gracefully when the functionality is missing in the Word version. Additionally, the layer implements changes to add-in to determine the correct version specific library to load and all method calls to Word object model using reflection.

For host application integration of the software platform, many interfaces provide support for including a hook that assists the host application to provide the user interface (UI) real-estate for the container as well as providing the integration mechanism itself. The UI real-estate is an area on the screen set aside for the container and a toolbar button. The host application is responsible for creating this space and creating an instance of Forms.DynamicContainer. Generally a window is created as the parent of the DynamicContainer. Additionally, the host is responsible for providing the ability to resize the area for the DynamicContainer.

In one example, the software platform is a managed .Net product with the Common Language Runtime (CLR) at the core and is loaded into the host process. CLR is a platform for software development that provides services by consuming metadata. In one embodiment, the software platform provides support and help for creating unmanaged host integrations using C++/COM. From a COM based language, the CLRLoader can be used to load the CLR into process, and invoke a designated managed class in a separate assembly to bridge into managed code and the rest of the add-in implementation. The CLRLoader is a COM object that can be created using standard COM methods (CoCreateInstance( )etc). It provides an interface that starts the CLR, and can load a managed class from an assembly with information provided in a configuration file. The managed class that is created by the CLRLoader must be given the HostShim Attribute and the user must define a method called "Configure" that returns a void and has a single "object" parameter. The software platform host application should implement the interface. Additionally, all the interfaces defined in the project, file document.cs are implemented on a set of classes to provide access to the document content of the host application.

In some exemplary embodiments, the container is designed to host feature application features and functions. However, some embodiments host the feature application itself. Hosted within the container is a browser control or mini embedded browser. The browser control does application user interface (UI) rendering and script execution. An exemplary browser control is Internet Explorer but any web browser or equivalent would be acceptable as well. UI rendering refers to displaying the user interface of the feature application within the container. The feature application UI's are developed using html and Cascading Style Sheets (CSS) but some embodiments use other browser based technologies, such as ASP.Net pages, Silverlight applications, Adobe Flash applications, etc. Much of the functionality of the feature applications is implemented in the JavaScript programming language. Embedded in the browser control is a JavaScript execution engine that reads the script and performs the requested operations defined in the JavaScript program.

Feature applications are designed with intent of reusing the software platform and functionality. They are developed independently but may be dependent on the software platform components. For example, one app inserts and updates flags. Assuming the software platform already has a communication service block and diagnostics service block (service blocks described in further detail below), the communication service block could be used to gather flag information and the diagnostics service block could be used to add tracing and logging into the application as well as add exception handling into the application.

Another example feature application provides linking to referenced documents. This feature application relies on Office Integration to provide a handle to the document in focus within Word. The application should also include the ability to select referenced documents for analysis. A diagnostics service block with the software platform may be used to add tracing and logging into the application as well as add exception handling into the application.

There are a wide variety of ways to develop an application that can be hosted within the software platform container. At a minimum in the exemplary embodiment, the user needs to provide an XML feature file that informs the software platform where the HTML page for the UI resides and the HTML UI itself. The Features XML file is a simple XML document that contains the URL for the main UI for a given feature/application. It consists of a root element "", a single child element "" whose content is the URL of the HTML User Interface of the application. This features XML file is deployed to the user's desktop. The UI can take the form of a static HTML page or other web application language. The inclusion of a script tag for the inject.cs script file facilitates access to the desktop injected items of the Host and ServiceLocator. The ServiceLocator is used to create instances of other Desktop Services by name. The UI location is constrained by the container, and thus influences design of the UI.

If the application needs to access content from within the software platform host application, the exemplary embodiment references the two JavaScript files (inject.cs and Load.cs) that are a part of the software platform main web package. JavaScript interacts with the desktop services provided. This gives access to a JavaScript reference to the "host" object as well as the "locator" ServiceLocator object. Finally, if the application provides a desktop service, the service implementation (See Software Platform Exemplary Service Practices section) is provided in an installable package.

Feature applications call service blocks which are designed with the intent of reusability and expose the services of those feature applications. In other words, the purpose of service blocks is to supply local reusable components to a feature application. The functionality can be accessed via JavaScript and/or by referencing the necessary .Net assemblies. Examples of application building platform components that can be leveraged are more fully detailed and set forth in U.S. Published Application Publ. No. 2010/0115401, entitled SYSTEM AND METHODS FOR WEB-BASED CONTROL OF DESKTOP APPLICATIONS, the entirety of which is incorporated by reference herein by reference.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to Internet-protocol (IP) address for an online information-retrieval system, such as the Westlaw system and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server may receive one or more of the framework, tools, APIs, and add-on software for loading onto one or more client devices 130 using internal processes.

Once installed in whatever fashion, a user may then be presented an online tools interface in context with a document-processing application. In the exemplary embodiment, this entails a user launching and opening or creating a document using one or more of the following independent applications: Microsoft Word word processing application, Corel WordPerfect word processing application, Internet Explorer browser application, Adobe Acrobat desktop publishing application, and Microsoft Outlook email application. As used herein "word processor" and "word processing application" refers broadly to "document processors" and "document processing applications" and the use of "word" and "document" should be given broad meaning in the context of units of communication and include such forms as electronic mail and other discrete forms of electronic communications or containers of information. Add-on software for one or more of these applications is simultaneous invoked, which in turn results in presentation of the add-on menu. The add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

For example, the user launches the host application (i.e. Microsoft Word, WordPerfect, etc.) to work on a document, e.g., research paper. A Word processor Software Framework (WSF) interface includes code, add-on or module that may be loaded as an add-on to the host application, e.g., App 138. This will load the WSF Document API, the WSF Application Container, initialize the installed Application List, and create the UI elements (Ribbons, toolbars, menu items, etc.). The user opens a document and selects the desired WSF Application from a list of applications presented via the integrated UI elements. WSF displays the application within the WSF Container and navigates the embedded browser to the applications base URL (server 120, appropriate portion of IIT module 126). WSF applications can be installed and run as: Local HTA (i.e., locally installed HTML, JS, CSS, etc.); Enterprise web application (intranet or extranet); or Internet web application, for example. WSF injects the WSF Document API references into the JavaScript execution engine for access from the applications JavaScript. The document in display (active edit window of host application, such as a word processing application) preserves the context of the application in WSF (i.e., each document has its own instance of WSF which can be customized based on user preferences).

The WSF JavaScript execution engine allows the application code to run. The application can use the WSF API's to access the contents of the opened host (i.e., Microsoft Word, WordPerfect, etc.) Document, including modifications to these documents. The WSF API's exposed to the client include but are not limited to: collection of Open Documents, including API methods for accessing Document specific data; collections of Paragraphs, Footnotes, Endnotes, Tables of Authority, hyperlinks, images and many other document content objects within a specific open document; and the ability to create a Location object to represent a given textual location within the document.

The WSF API methods that are called by the application in turn will call methods exposed by the Host application (ex. Microsoft Word). The manner in which these calls are done is Host application specific and dependent on facilities exposed by the Host application. The WSF manages the mappings between its own API and the functionality exposed by the Host. Additionally, the application can use native browser capabilities and other WSF functionality to communicate with web services available locally on the host machine, at enterprise (intranet or extranet), or the over the Internet.

FIG. 2 illustrates another representation of an exemplary system 200 for carrying out the herein described processes that are carried out in conjunction with the combination of hardware and software and communications networking. In this example, system 200 provides a framework for searching, retrieving, analyzing, and presenting a set of recommended citations for inserting into documents as well as a system for monitoring and tracking user subscription rights, access, and usage and for downloading tools and software associated with providing enhanced services to subscribed users. System 200 may be used in conjunction with a system 204 offering of an information or professional services provider (ISP), e.g., a variety of Thomson Reuters Corporation entities, and include an Information Integration and Tools Framework and Applications module 126, as described hereinabove. Further, in this example, system 200 includes a Central Network Server/Database Facility 201 comprising a Network Server 202, a Database, e.g., WoS/WoK 203, a Citation Recommendation Module (CRM) 205 having as components a Search/Analysis Module 209, which includes a Text Analysis Module (TAM) 206, a Personal Profile Module (PPM) 207 and a System Analysis Module (SAM) 208. The Central Facility 201 may be accessed by remote users 210, such as via a network 226, e.g., Internet. Aspects of the system 200 may be enabled using any combination of Internet or (World Wide) WEB-based, desktop-based, or application WEB-enabled components. The remote user system 210 in this example includes a GUI interface operated via a computer 211, such as a PC computer or the like, that may comprise a typical combination of hardware and software including, as shown in respect to computer 211, system memory 212, operating system 214, application programs 216, graphical user interface (GUI) 218, processor 220, and storage 222 which may contain electronic information 224 such as electronic documents. Remote users 210 may seek research assistance in the form of selecting text included within a document and seeking a set of suggested or recommended citations to match the selected text segment. Citation recommendation functionality is provided by CRM 205. Although shown as residing at the central facility, citation recommendation functionality may be distributed and may include operation by way of a client-side add-in or plug-in residing at client device 211 such as in GUI/Add-in area 218.

Client side application software may be stored on machine-readable medium and comprising instructions executed, for example, by the processor 220 of computer 211, and presentation of web-based interface screens facilitate the interaction between user system 210 and central system 211. The operating system 214 should be suitable for use with the system 201 and browser functionality described herein, for example, Microsoft Windows Vista (business, enterprise and ultimate editions), Windows 7, or Windows XP Professional with appropriate service packs. The system may require the remote user or client machines to be compatible with minimum threshold levels of processing capabilities, e.g., Intel Pentium III, speed, e.g., 500 MHz, minimal memory levels and other parameters.

The configurations thus described are ones of many and are not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

In one example, an author using the computer 211 executes a document rendering or processing application 216. According to one embodiment of the invention, the document rendering application 216 is a word processor used to draft text and similar mixed media documents, such as MICROSOFT WORD™. Alternatively, the document rendering application may comprise a HTML text editor, such as provided by MICROSOFT or BBEDIT™ by Bare Bones Software, Inc. Indeed, all software systems designed to manipulate and render text data files fall within the scope of the present invention.

Many document rendering applications comprise the capability to expand the functionality of the application through the use of a plug-in or similar architecture. The exemplary system of the present invention includes a citation editor add-in client 218 and may include GUI functionality and that provides citation processing within the context of the document rendering application 216. The author is provided access to functionality of the citation editor add-in 218 by clicking graphical toolbar elements and menu commands that the citation editor add-in offers. Alternatively, the citation editor add-in may be a supplemental program that adds custom commands or custom features to an application. It should be noted that the citation editor add-in, as well as the other components of the present invention, may be embodied as software stored on computer readable media that, when loaded by a computer or when accessed by a computer such as through a web portal, instructs the computer to execute the processes or otherwise presents remotely executed functionality described in greater detail herein.

According to one embodiment of the invention, the citation editor add-in 218 may be, e.g., a COM (Component Object Model) object designed to be loaded and run in one or more Microsoft Office applications. COM add-ins are designed to connect to and disconnect from one or more Office applications using an architecture that is shared between the applications. The citation editor add-in 218 may be implemented with any number of programming tools capable of creating DLLs (Dynamic Link Libraries).

The citation editor add-in 218 provides access to multiple functions related to searching for citations, presenting recommended citation data, selecting from recommended citation data, and inserting recommended citation data, as well as bibliographies. Exemplary functionality includes the capability to find, edit and insert citations, access to an external citation application, format a bibliography, and may include user usage monitoring and tracking. The citation editor add-in 218 also provides instant formatting of citations, such as be a selection of citation style or the like, while an author is drafting a document. According to embodiments of the invention the citation may comprise a graphic, such as a drawing or chart that is being cited.

When the document rendering application 216 is executed, the citation editor add-in 218 is loaded. The citation editor add-in 218 implements the menu and toolbar elements, which provide communication to the citation recommendation system or application 209, which may include functionality executed locally at client device 211 or remotely at ISP 204, and the document rendering application 216 as required to implement or execute the command selected by the document author, e.g., "suggest citations" discussed hereinbelow. According to one embodiment, this communication in implemented by way of COM interfaces exposed by the document rendering application 218 and the citation recommendation system or application 209. Furthermore, the citation editor add-in 218 monitors the document being processed by the user, e.g., from documents 224, for conditions that require citation processing, e.g., the presence of a selected text segment and/or the presence of a citation marker loci or location appearing within the document.

In addition, the system may include a reference library, e.g., loaded locally by a reference tool or accessed remotely by the citation recommendation system or application 209 or associated with a personal profile record when the document rendering application 216 is operated. The reference library may serve as an intermediary between the citation editor add-in 218 and the citation recommendation system or application 209. In one manner, the library may convert data from an initial format to a format that is native to the citation recommendation system or application 209. For example, where the citation editor add-in 218 is implemented as a COM object, the library translates COM data elements into data elements that adhere to the communication protocol or format that is native to the citation recommendation system or application 209, e.g., provides the COM interface.

Further, source application switching provides a method to store an identical reference library in a desktop database and on the Web, insert references into a document from either location, and seamlessly format and update citations from either source application. Microsoft Word citation import provides a mechanism to harvest XML citation data inserted into a document by Microsoft Word 2007 or later, and to convert this into a preferred, predefined or proprietary in-document data format. Section bibliographies provides a mechanism to identify section markers within a document and to create separate bibliographies at the end of each section, with or without a complete bibliography at the end of the document. Composite citations provides a mechanism for treating a group of references as one composite citation, grouped together as one entry in a bibliography and distinguished individually by specific alphanumeric labels as specified by a given set of bibliographic formatting rules. Link from citations to bibliography provides a mechanism for navigating to an entry in a bibliography by clicking on an in-text citation, which is treated as a hyperlink for this purpose. Generate an organizational group in source reference management application provides a mechanism to automatically create, within the source reference management application, an organizational grouping of the references being used in a document, which grouping is then updated automatically as references are inserted into the document or deleted from the document. Manage references from multiple libraries provides support for inserting references into a document from multiple reference libraries, and provides a user interface which indicates the source library for each reference and allows the user to update individual references from their source library or to replace a reference with a version from another library.

In one example, an author may supply an incomplete or partial citation within a document or selected text segment of the document or closely associated with a marker or loci in the document. The citation recommendation system or application 209 may recognize the partial citation data within a selected text segment and thereby narrow and facilitate the citation recommendation process or it may automatically modify the partial citation data to provide a complete formatted citation bypassing the need for presenting a recommended citation set. In conjunction with the present invention, a citation editor may periodically scan the document to identify temporary citations and automatically complete and correct such partial citations. A GUI may be presented for user confirmation of the inserted citation and/or to facilitate a search for a recommended citation set. Exemplary functionality is disclosed in U.S. Published Application No. 2012/0072422, entitled SYSTEM AND METHOD FOR CITATION PROCESSING, PRESENTATION AND TRANSPORT AND FOR VALIDATING REFERENCES, the entirety of which is hereby incorporated by reference herein.

In operation, when selecting a text segment for input to the citation recommendation system or application 209, upon processing the text selected along with the personal profile associated with the user, the system generates a resulting set of recommended citations from which the user may choose. Upon choosing the citation that the author wishes to insert into the document, the citation data is passed to the document via operation of the word processor 216 and citation editor add-in 218 for insertion into the document. In one manner, "field codes" that references citation data may be inserted into the document, which may be stored in local or remote citation libraries maintained by the user or a third party data provider. The field codes are links to underlying citation data that is used as a source for the formatted citation displayed in the document. The format defined through the field codes may be set by author-defined parameters. Various scholarly journals have different constraints regarding the formatting requirement for citations. For example, the Journal of the American Medical Association may require that citations adhere to a first format, while the journal Science may require a wholly different citation format. The system of the present invention may advantageously be supplied with citation format parameters for well known journals and publications. In this manner, an author may ensure that citations within a document adhere to a target publication's citation specifications simply by selecting the publication through an interface whereby the parameters are automatically set. Furthermore, functionality may be provided whereby an author may change the target publication for a document, causing the software to traverse the document and modify the format of the citations contained therein to adhere to the new target publication's citation specifications.

Additionally, an author may edit selected citations that have previously been inserted into a document. For example, an author may revise a set of text surrounding an inserted citation, which may cause the system to automatically or by user control process the revised "text segment" to determine if the inserted citation is still valid or the most highly related citation based on the text analysis and personal profile data. The system may provide the user a revised set of recommended citations from which to choose to replace the previously inserted citation.

The invention may be used in conjunction with an authoring, submission, and validation system, e.g., EndNote using EndNote XML reference mark-up, for preparing structured formatted documents. Such software applications may be used to format Microsoft Word documents by identifying and tagging data contained in the document prior to submission to a publisher. For instance documents may be marked or tagged using, by way of example only and not limitation, processes based on GML, SGML or XML. By marking or tagging the document to create a structured document, e.g., using GML, SGML or XML based mark-up, the cited references may be more easily extracted from the document and included in a reference list for validation. The present invention may be used to validate a set of proposed citations. A structured document may be formatted according to specific bibliographic style using application functions. For instance, the EndNote Tool Bar may be invoked to call up APIs (application programming interfaces) of MS Word hidden code fields. The structured Word document may be loaded or uploaded into a work flow system, e.g., Manuscript Central, in communication with a database. In addition, the system may provide for automatic hyper-linking between in-text citation and a bibliography associated with the document, a project, the user (personal profile record), or a database.

Another exemplary workflow is when a user is collaborating with another author (co-author) on a common document or project. The authors may access the common document or portions thereof (e.g., chapters of a book or treatise), with both having the ability to insert citations.

Figure 3:
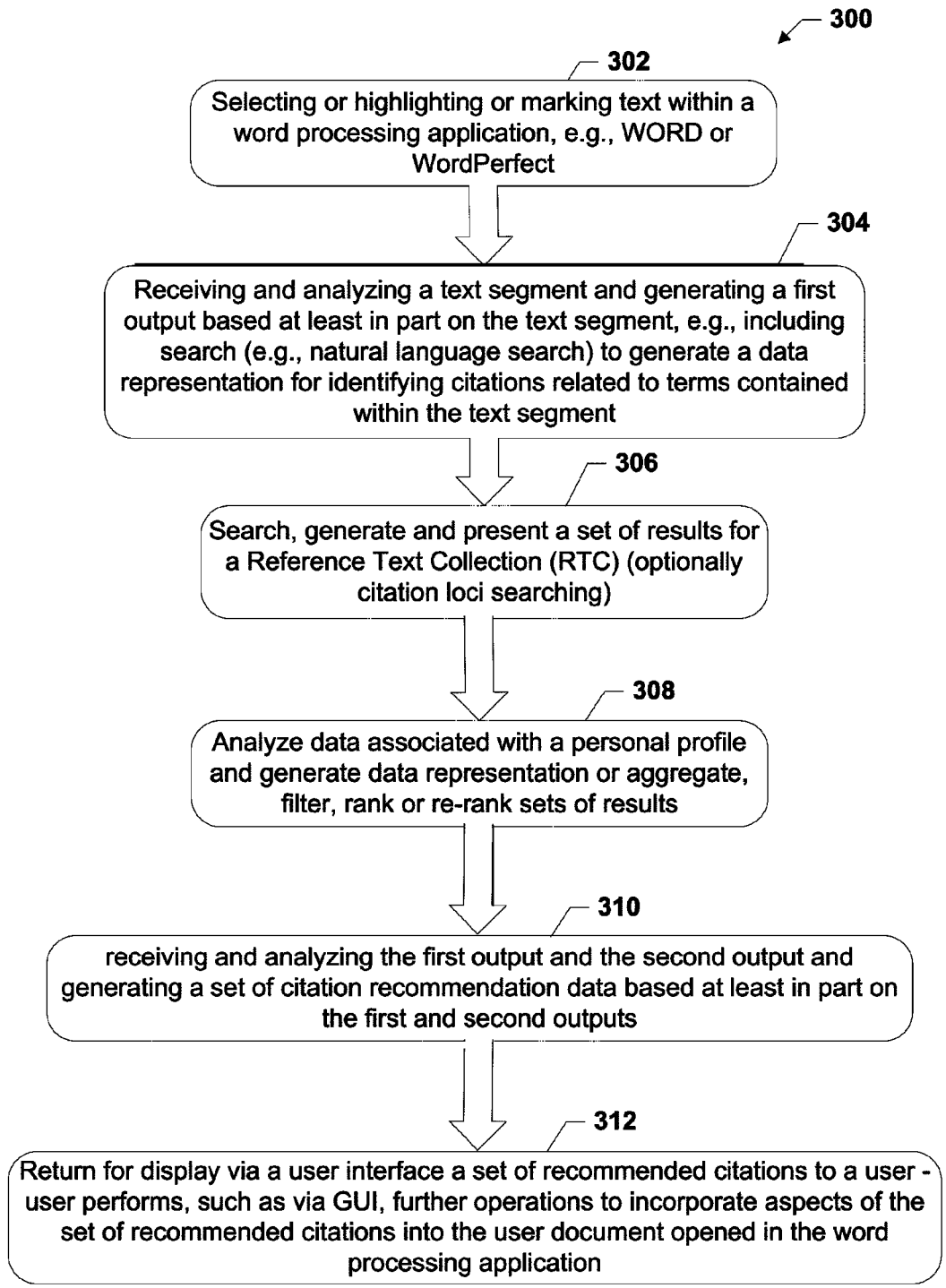
FIG. 3 is a flow diagram presenting a method for generating a set of recommended citations according to one embodiment of the present invention.

In one exemplary method of operation, and with reference to the flow of FIG. 3, the following processes are performed. Initially, at step 302, a user highlights, selects or marks text within a document presented in a word processing application. At step 304 the user submits the highlighted text to the CRM for analyzing the highlighted text segment. The CRM generates a first output based at least in part on the text segment, e.g., including search (e.g., natural language search) to generate a data representation for identifying citations related to terms contained within the text segment. At step 306, the system searches, generates and presents a set of results for a Reference Text Collection (RTC) (optionally rank the set of results). The search may employ traditional search techniques (e.g., natural language processing) and/or it may include a citation loci search (discussed hereinbelow in detail). At step 308, the system analyzes data associated with a personal profile and generates data representation or aggregate, filter, rank or re-rank sets of results. At step 310, the system receiving and analyzing the first output and the second output and generating a set of citation recommendation data based at least in part on the first and second outputs. The processes of steps 304-310 may be performed in part outside the user experience. At step 312, the system returns and presents for display via a user interface a set of recommended citations to a user. The user then performs, such as via GUI, further operations, e.g., selecting a recommended citation from a list of recommended citations, to incorporate aspects of the set of recommended citations into the user document opened in the word processing application.

Figure 4:
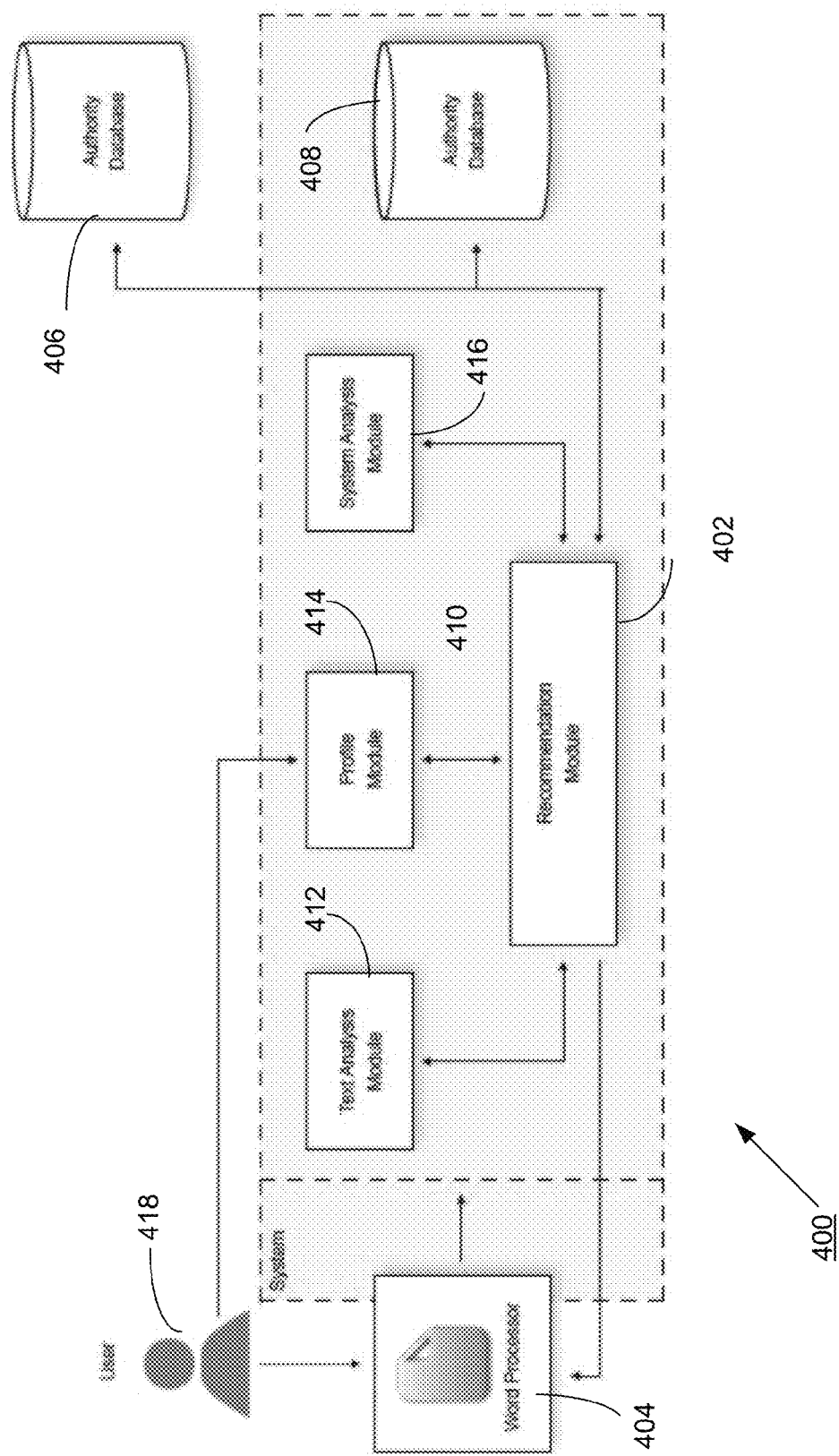
FIG. 4 is a schematic diagram presenting a configuration of hardware and software components and data flow according to a third embodiment of the present invention.

FIG. 4 illustrates a further exemplary embodiment of the hardware and software functionality associated with the present invention. In this example, the invention provides a computer-based system a server system 402, a word processing application 404 and one or more authority databases 406-408. The system 400 includes a citation recommendation module 410, which receives input from text analysis module (TAM) 412, personal profile module (PPM) 414, and system analysis module (SAM) 416. The text analysis module, the personal profile module, and the recommendation module are shown in schematic form and may include functional components residing and executed on one or more of a local client device and a central server. In operation, a user 418, such as an author preparing a document via word processor application 404, identifies, marks, highlights or otherwise selects a portion of text or "text segment" from within a document. As described above, TAM 412 performs processes, such as natural language processes, on a received text segment input and generates a first output, e.g., a set of potential or candidate citation references or documents or other form of data representation.

Personal profile module 414 receives or accesses information associated with a user and generates a second output or further processes the output of the TAM 412. The CRM 410 processes the TAM and PPM outputs to arrive at a set of recommended citations for presenting to the user 418. The citation recommendation module 410 is responsive to the first output of the TAM and the second output of the PPM and generates a set of citation recommendation data. In addition, a system analysis module 416 may be included to incorporate further functionality directed to processing system information for use in arriving at a set of recommended citations.

In operation, the system 402, and in particular recommendation module 410, may refer to one or more authority databases 406-408 in determining a set of recommended citations to present to user 418. Authority databases 406-408 may represent databases of citations or documents recognized as being highly credible in a given are or research.

FIG. 5 represents an exemplary user registration interface presented to users attempting to access an author/researcher service platform such as one incorporating the present invention. In the context of the present invention, the registration process may also provide useful user information that may be incorporated into a personal profile record. For example, registration interface 500 may alternatively allow a user to directly register for an account or to sign on using a known and acceptable existing account, e.g., facebook, linked-in, or other social media site. The login may be processed through an existing service provider account, such as through Thomson Reuters OnePass. During registration, at pull-down 502 the user provides an institution entity with which the user is associated, e.g., a researcher or student at a university or research institution (e.g., National Institute of Health). At pull-down 504 the user indicates one or more fields of research or "subject area(s)" of interest and in which the user is actively engaged in research or similar activities, e.g., allergy and asthma. At box 506 the user indicates whether he/she has authored or contributed to publications in the past. This identifies the user as a published author and this information may be used to help identify or match the user with records contained in an authority database or other resource and may be used to disambiguate information about this and other users.

Figure 6:
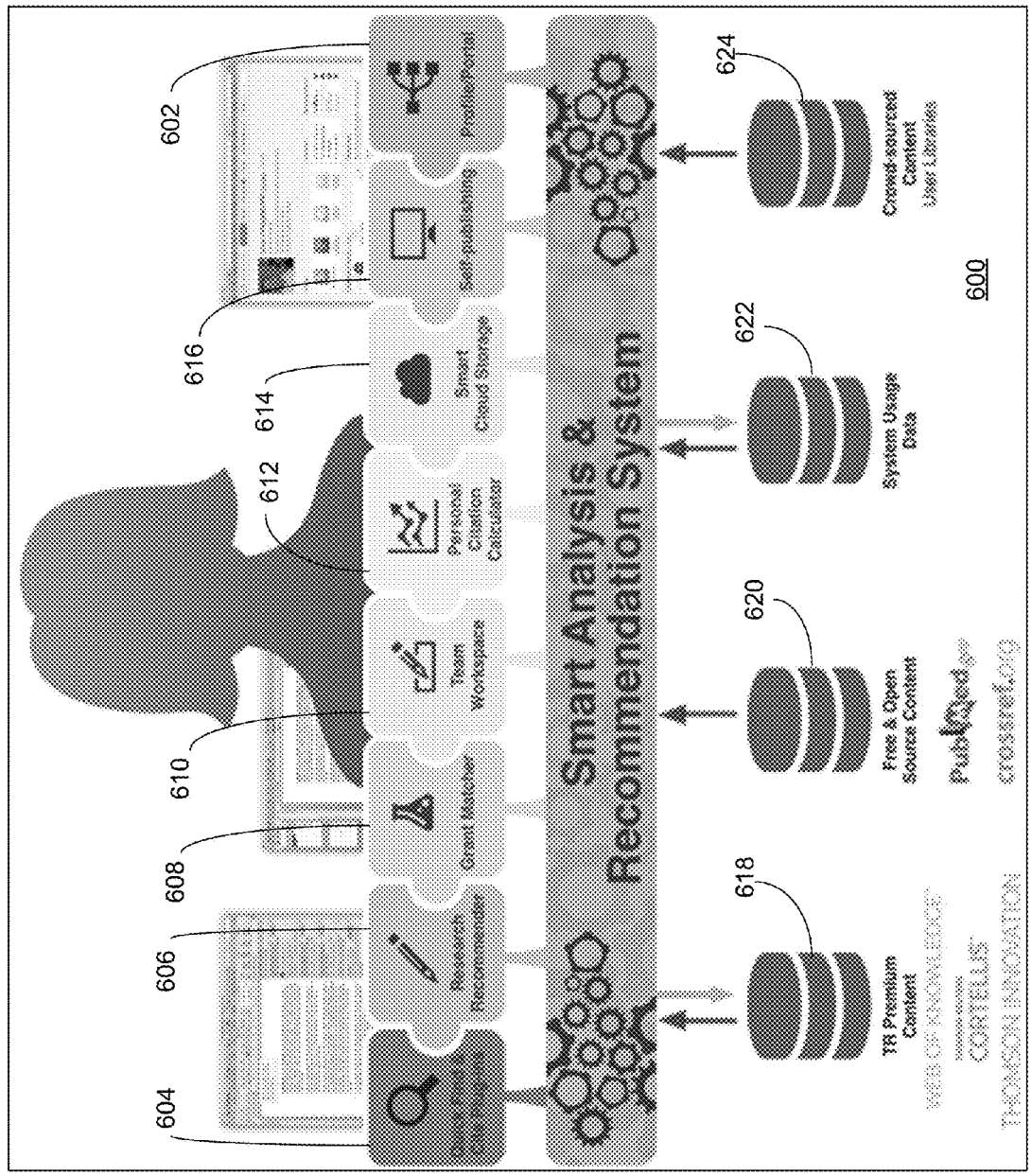
FIG. 6 is a schematic diagram presenting a user web portal or browser configuration according to one embodiment of the present invention.

FIG. 6 is a schematic representation of an exemplary Citation Recommendation System (CRS) 600 in the context of the present invention. After registering or otherwise logging onto a system, the user has associated the session with the login credentials to a particular personal profile, which may take the form of a personal profile record stored in a database and/or having distributed profile components stored and accessible through multiple databases and systems. As reflected at 602, by way of a web portal, home page or other suitable interface (e.g., FIGS. 7-9), the user may access his/her profile record to update, revise, supplement or simply monitor profile data concerning the individual user. Similarly, the user may access research assistance tools as reflected at "Quick find & cite" 604 (e.g., plug-in for email and web browsers) and research recommender 606 (e.g., plug-in for word processors). Exemplary embodiments to implement the research and citation tools are shown in FIGS. 12-18).

The user interface also provides a comprehensive set of researcher tools as the exemplary embodiment is researcher centric or focused to deliver a heightened experience to the user. In particular, CRS 600 also includes a grant matcher or funding finder 608, team or project workspace 610, personal citation calculator 612, smart cloud storage 614, and self-publishing 616. With grant matcher 608, the CRS may apply the personal profile information in conjunction with awareness of past or current research activities of the user to automatically (or by focused direction of the user) monitor available resources to identify and match potential sources of grant and research funding. For instance, a grant publicized at grants.gov seeking research in a particular area of research may be matched up with user profile and activities. CRS 600, upon identifying such a potential match, may generate an email or indicate the potential match via an area on a user's home page or dashboard. Team or project workspace 610 reflects a shared path to project or paper information and access. For example, multiple authors working together or separately on individual chapters of a book or sections of a paper are provided access to monitor research activity and a common link to citation and document data and the CRS may take into account collaborative activity in arriving at recommendations for a user.

CRS 600 includes access to a variety of data sources, including content and tools related to content. For example, CRS 600 includes means to communicate with premium or proprietary content 618 (which may be internal to an organization hosting the CRS service), such as offered by Thomson Reuters, including Web of Knowledge™ (WoS), Web of Science™ (WoS), Cortellis™, Westlaw™, and Thomson Innocation, and resources offered by others such as Mendeley research networks, Google Scholar, RSS, SciVerse, Microsoft Academic Search, IEEE (Institute of Electrical and Electronics Engineers), ExLibris, Scopus, and Ebsco. The CRS system also may access external or public database(s) and resources 620, e.g., PubMed.gov, crossref.org. CRS 600 also includes a data store to record usage data 622, which may be used to enhance the personal profile data and may be used to further refine recommendations made by the system. Crowd-sourced content 624 may include social media related information, user libraries, etc.

Figure 7:
FIG. 7 is a user dashboard in connection with the present invention.
Figure 8:
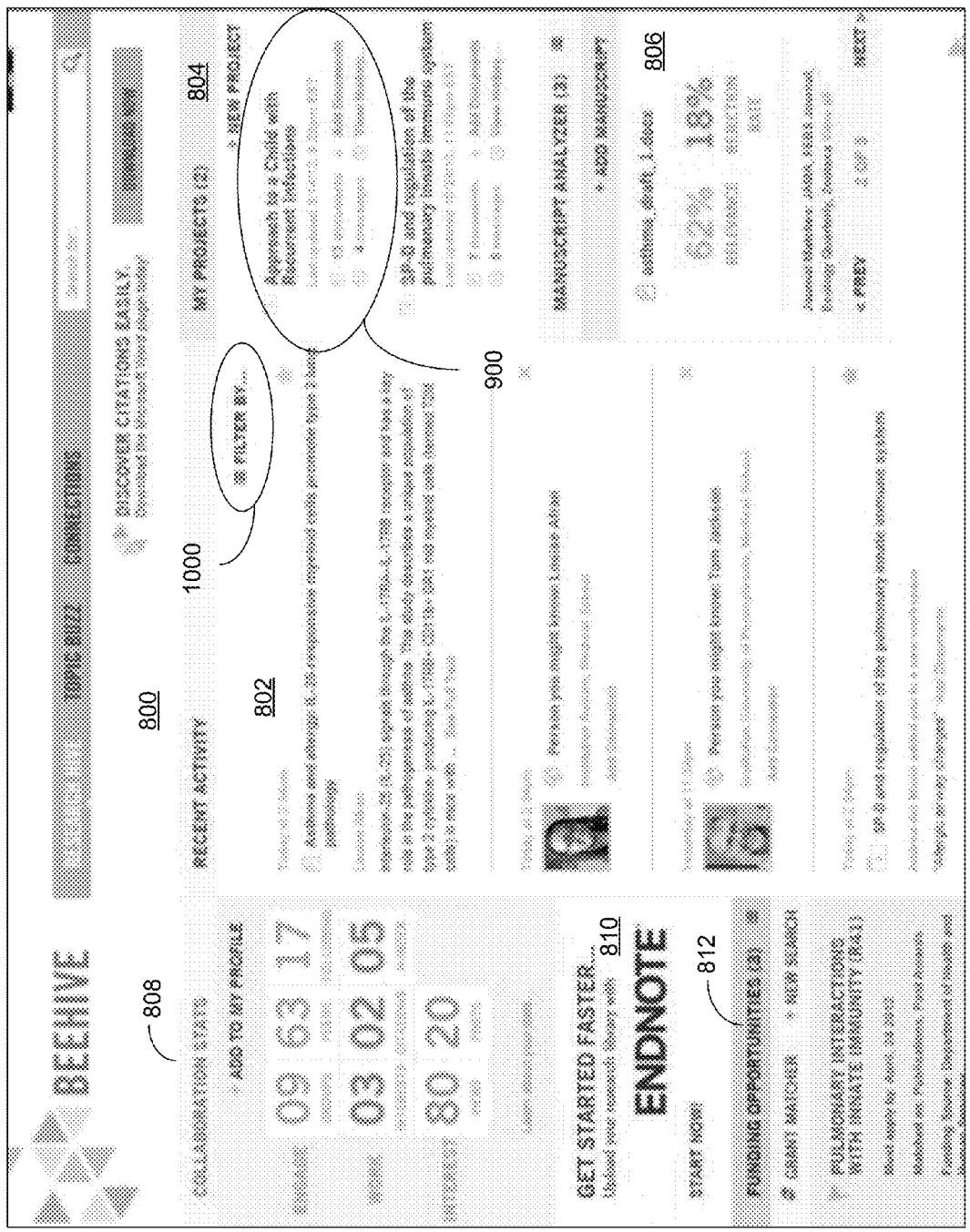
FIG. 8 is a user homepage or portal in connection with the present invention.
Figure 9:
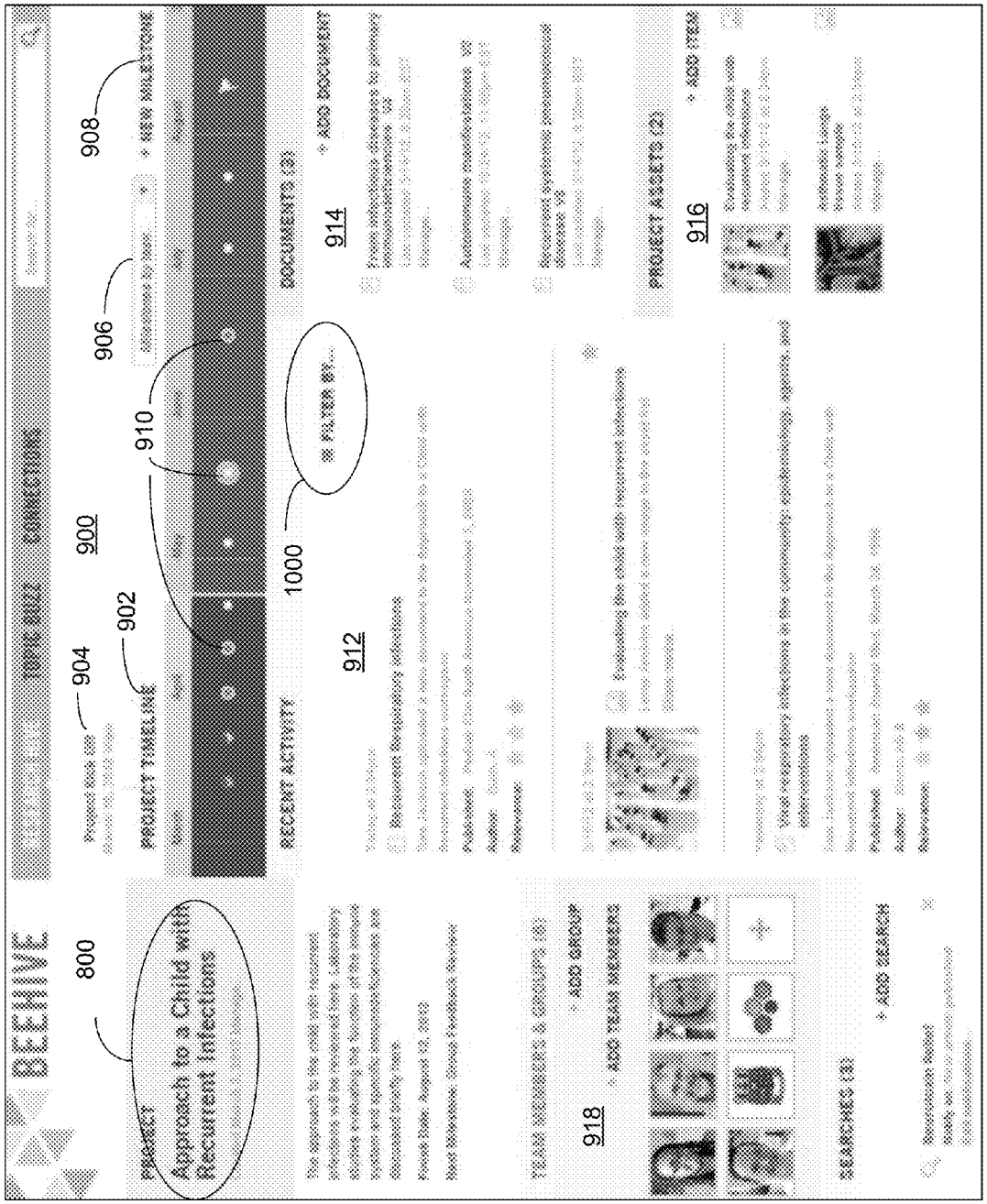
FIG. 9 is a project homepage or portal in connection with the present invention.

With reference to the exemplary embodiment shown in FIGS. 7-9, the local client processing device includes an electronic user dashboard or web portal page for displaying multiple areas and topics of interest, for example: search citation recommendation; search parameters; search database or resource selection or filter; user activity; document or project related data; collaborator activity; grant or funding related data; project timeline or management workflow; data filtering criteria; and search history.

FIG. 7 illustrates an exemplary individual user "dashboard" as a portal to research and other tools of interest to the user. In this example, user "Lance J Kriegsfeld, PhD." Is logged onto the CRS system and has activated dashboard 700 via tab 702. The dashboard includes an "Edit Profile" button to enable the user to edit personal profile data, e.g., update or revise or supplement information about and concerning the user, which data may be used in the CRS to arrive at recommended citations to insert into research papers or the like. Area 706 shows activity of interest or related to the user, including connections, group memberships, grants in process, and papers in process. Area 708 is a pictographic representation of the user's collaboration network with the user shown in the middle with connections to others with whom the user has collaborated with on projects or otherwise. Area 710 gives the user a summary of his/her publications with statistical information and links. Area 712 provides the user a summary of fields of research or interest with links and statistics. Scorecard 714 provides the user a statistical summary of interest related to publication resources, e.g., the number of papers included in Web of Science that cite to a paper authored by the user (e.g., 200). Area 716 provides a list of recommended papers that may be of interest to the user. This list of recommendations may be based on the user's personal profile. Areas 718 and 720 provide sets of articles or other media that may be of interest to the user based on the user's personal profile, which may include a predefined set of preferences.

The PPM of the citation recommendation system accesses and analyzes multiple forms of personal profile data, such as those identified above, to assist in the citation recommendation process. For instance, a paper often cited by the user may be added to a set of candidate citations generated by the TAM or it may be re-ranked to a higher position of relevance if already included in the TAM output. Also, as many authors prefer to self-cite for a variety of reasons, the user's own papers may be supplemented to the TAM output or may be ranked higher if included in the TAM output. Also, an existing reference library, such as maintained by a user in EndNote, may be considered in ranking or including in the set of citation recommendations.

Further, the PPM may use data as meta-data to a paper, journal or project. For instance, meta-data may be associated with a domain such as a field of research. Certain fields of research may be characterized as dynamic or rapidly changing while other fields of research may be well established and characterized as relatively not dynamic, meaning substantial changes in the body of research happen more gradually. The system differentiates between dynamic and not dynamic fields of research such that it may rank more recent papers higher than papers further removed in time from the present paper in process. This meta-data associated with domain may also be used to filter out "older" papers. This threshold time period of relevancy depends on the area of research. This may be offset by ranking certain often cited "popular" papers, such as seminal works, more highly or passing through the filter. In this manner the system is making a determination that for certain areas of research, papers released more than a set time period are less likely to be relevant.

Similarly, a journal associated with a dynamic domain may be treated differently that a journal associated with a less dynamic domain. Likewise, a paper may have meta-data associated with it and may be identified as related to a dynamic or not dynamic area of research. This sort of analysis may be reflected in the data representation generated by the PPM in the second output or conditioning of the TAM output. This sort of meta-data may be used in the TAM process as well and in fact search collections may comprise such meta-data, which may be processed as a pseudo-document or surrogate document record.

FIG. 8 is a further exemplary user web page or portal 800. Area 802 shows recent activity associated with the user or with persons of interest or on a shared team. The system may also suggest persons of potential interest to the user and recent activity of that user, e.g., author of a paper in a shared field of research. As shown in the interface 1000 in FIG. 10, the user may filter the activity display and information by way of pull-down menu that includes selective filtering by: project updates; team members; user connections; publications; and messages/notifications. My Projects space 804 displays the user's related projects and provides the user a means to add a new project or link. The project space provides a statistical summary and links to project related information. For instance, and as shown in FIG. 9, a user may select the project "Approach to a Child with Recurrent Infections" to access information and links associated with that particular project. Manuscript Analyzer 806 provides a tool to measure and rate the relevance and projected rate of rejection of a paper, "asthma_draft_1.doc", potential journal matches (e.g., based on field of research and on user profile), and a way to add manuscripts. Area 808 provides a statistical representation of the user's collaboration efforts. Area 810 provides an integration of research tools or solutions, e.g., Thomson Reuters EndNote®. For instance, the user may upload a reference library from EndNote application into the CRS, which may then be associated with the user profile and used in the PPM to arrive at a set of recommended citations in papers in process. Area 812 further illustrates the grant matcher or funding finder aspect of the CRS. For example, given the user's profile data, the CRS may recommend potential grants of interest and display key information, such as grant submission deadlines and other prerequisites, funding source, matched criteria.

FIG. 9 is a further exemplary user web page or portal 900, displayed upon a user selecting the project "Approach to a Child with Recurrent Infections" from the link presented in FIG. 8. In this example, the project portal displays a Project Timeline feature 902 related to the selected project and that shows highlighted project milestones or events 904 and a link to view more particular information related to the event 904. Milestones may be displayed selectively by task type via a pull-down menu 906 and new milestones may be added via button 908. The timeline display provides a graphical representation of the status of milestones or events 910, e.g., completed, in process, not completed, past due, etc. A user may select a milestone to upload or link data or papers or reviews or the like as part of the work flow of the project. For example, FIG. 11 illustrates a milestone related interface for to access information and links associated with that particular project. Area 802 shows recent activity associated with the user or with persons of interest or on a shared team. The system may also suggest persons of potential interest to the user and recent activity of that user, e.g., author of a paper in a shared field of research. As shown in the interface 1000 in FIG. 10, the user may filter the activity display and information by way of pull-down menu that includes selective filtering by: project updates; team members; user connections; publications; and messages/notifications. My Projects space 804 displays the user's related projects and provides the user a means to add a new project or link. The project space provides a statistical summary and links to project related information.

Figure 12:
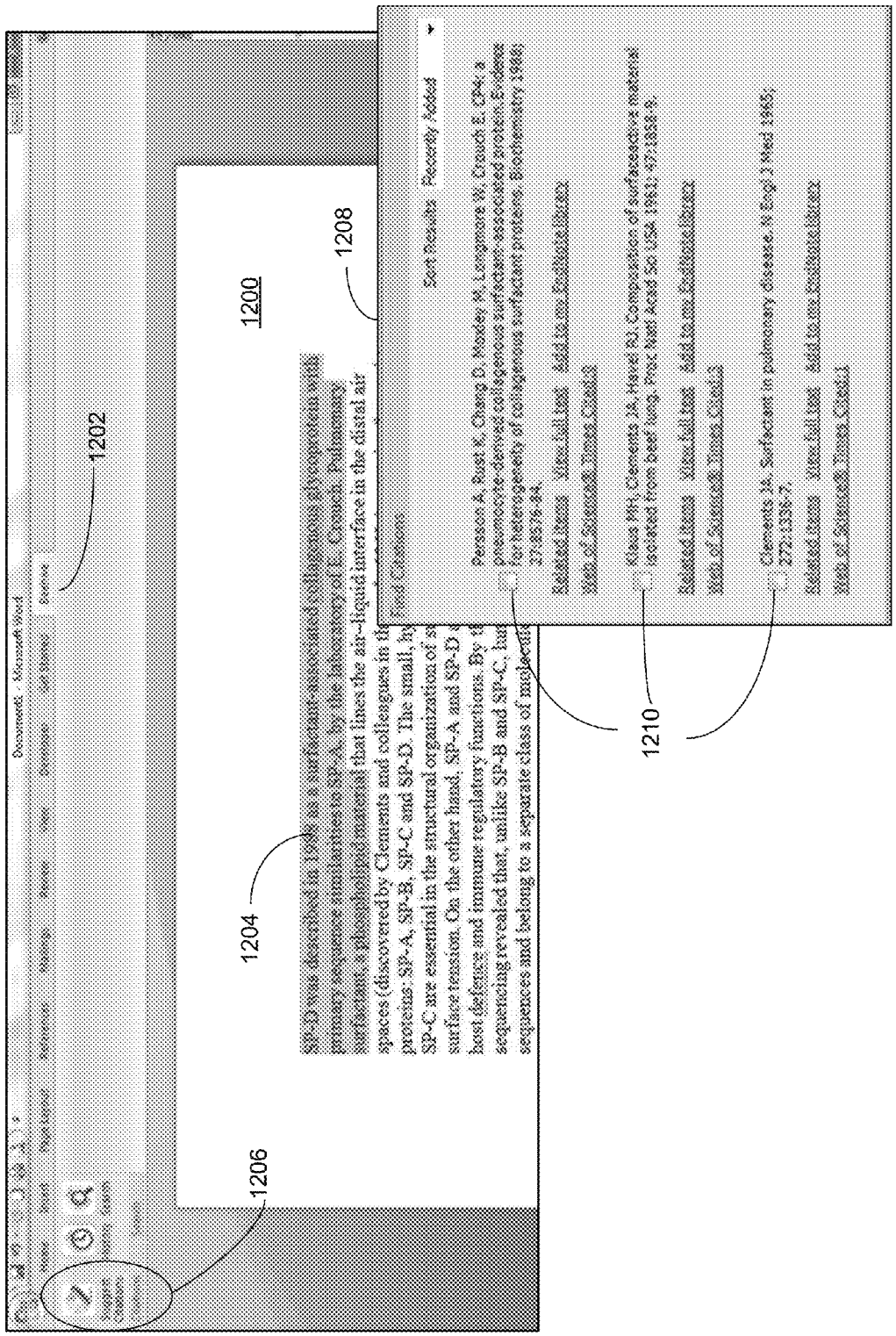
FIG. 12 is a user word processor document processing screen having a word processor plug-in in conjunction with the present invention.

FIG. 12 represents an exemplary document 1200 generated by a word processing application, such as Microsoft Word. A window includes a tab 1202 identified as "Beehive" that represents a CRS word processing plug-in that integrates and interfaces with a word processing application residing locally on a user's client access device, such as a PC computer. The access device may be connected to an intranet, Internet or other wired or wireless network. In operation, a user selects a text segment 1204 (shown in highlight "SP-D was described . . . phospholipid material") from text included in document 1200. The user then activates the CRS citation recommendation function by clicking on button 1206 identified as "Suggest Citations." The highlighted text segment is then processed by the CRS as described in detail elsewhere herein. In one alternative, the user may place a marker at the location intended for inserting a citation. The plug-in may then automatically collect text co-located with the marker (placeholder for a footnote or endnote), e.g., the sentence immediately preceding the marker, and perform the citation recommendation process on the collected text. Also, the plug-in may perform this process across an entire document looking for multiple such markers as opposed to performing the operation discretely. Accordingly, the author can perform the citation insertion process in a "batch" manner.

The CRS may have functionality and databases accessed remotely or in part locally residing in association with the plug-in. In operation a cookie connection is established between remote online login/credentialing and local plug-in operation. The CRS generates a list 1208 of recommended citations 1210 responsive to the text segment submitted and to personal profile data associated with the user or user account. The user may then select from the list of recommended citations for insertion in the document 1200. In addition, the system provides along with the list additional access to information about the recommended citations, for example: related items; view full text; add to my EndNote library; WoS times cited statistic. In one manner, the list 1208 may include a means for receiving user feedback as to the relevance of suggested citations. For instance, if a user feels certain citations are not particularly relevant then a check-box may be used to receive the user's feedback. This feedback information may be used to add to the intelligence of the system and to help train the citation recommendation system. Citations selected by the individual may be added to a bibliographic record, the user's reference library, such as maintained by EndNote tool, or in other locations. In this manner, a user or a group of users/collaborators or an institution can generate an "expert" library of references for use across an organization. Also, in selecting a recommended citation the system may update the user personal profile, such as a meta-data record associated with the user and historical tracking of usage. As discussed above, such "activities" are reported to the user's portal or dashboard and to collaborator portals and dashboards.

Figure 13:
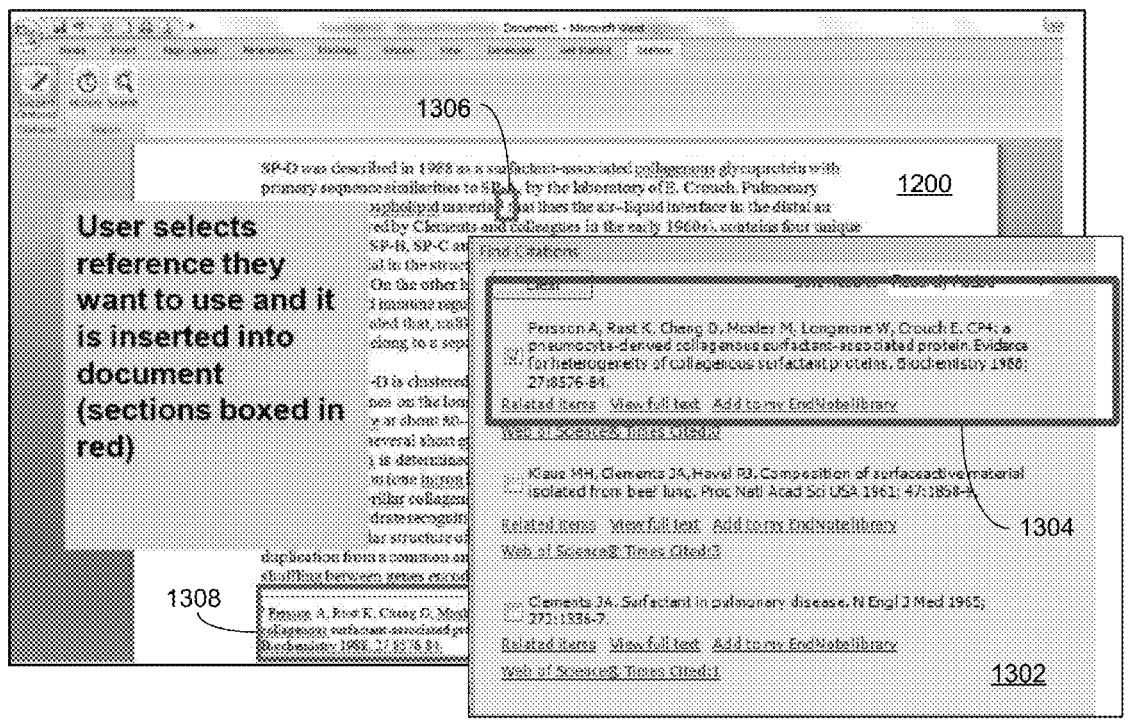
FIG. 13 is a user word processor document processing screen having a word processor plug-in in conjunction with the present invention.

FIG. 13 shows a subsequent screen shot of a word processor document 1200 having a selected citation "Persson A, Rust, K . . . " 1304 as indicated on list 1302 inserted as a footnote 1308 in document 1200. Footnote reference 1306 is inserted at the end of the text segment in the body of the document.

Figure 14:
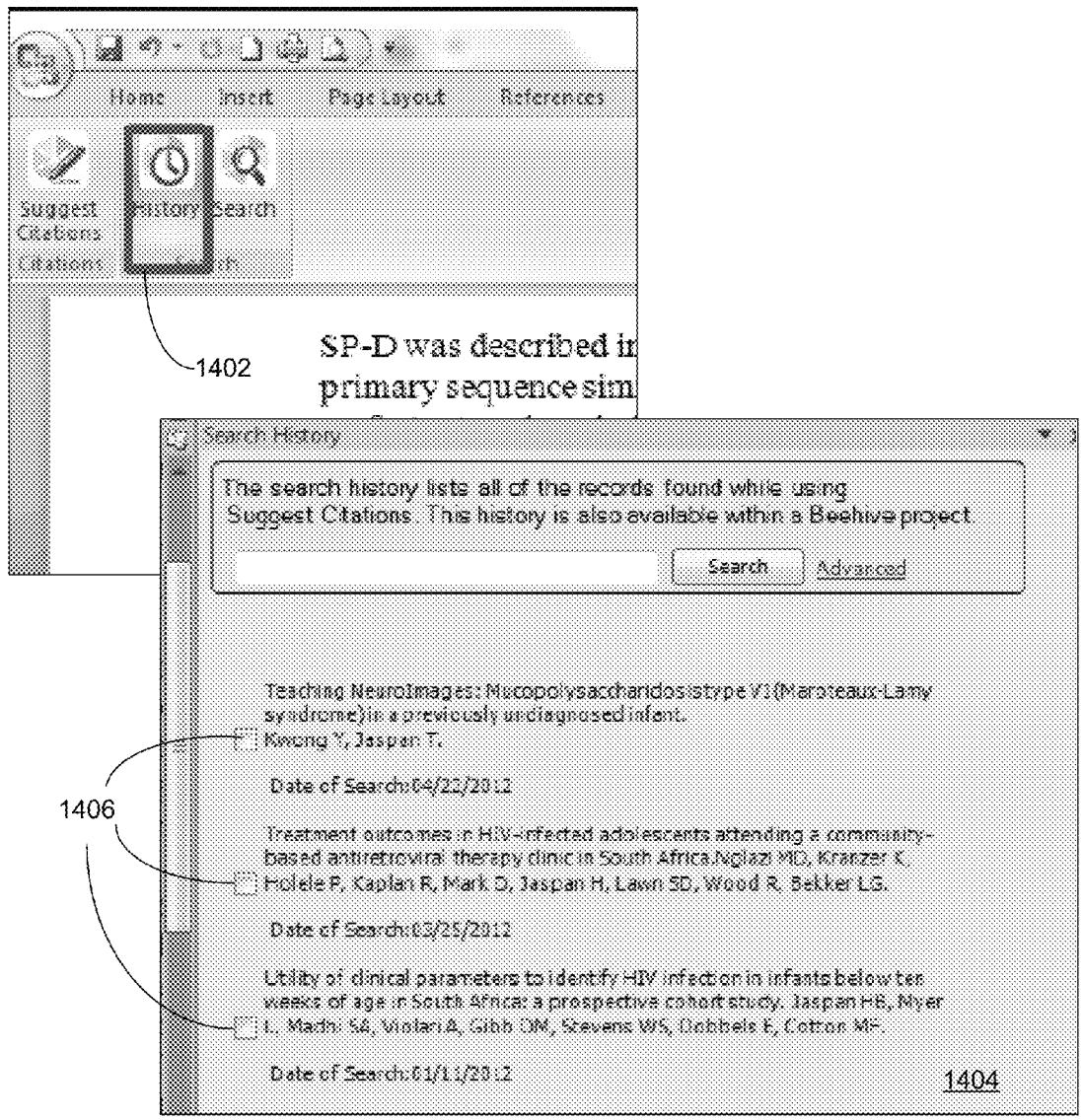
FIG. 14 is a user word processor document processing screen having a word processor plug-in in conjunction with the present invention.

FIG. 14 illustrates the History function associated with the CRS word processor plug-in. The user selects button 1402 identified as History in the toolbar and the system generates a dialog box 1404 or other such user interface representing the user's citation search history. In this case a list of prior citation search results 1406 is displayed for further action by the user. To navigate through a list, the user is provided with a search function to narrow or filter the results.

Figure 15:
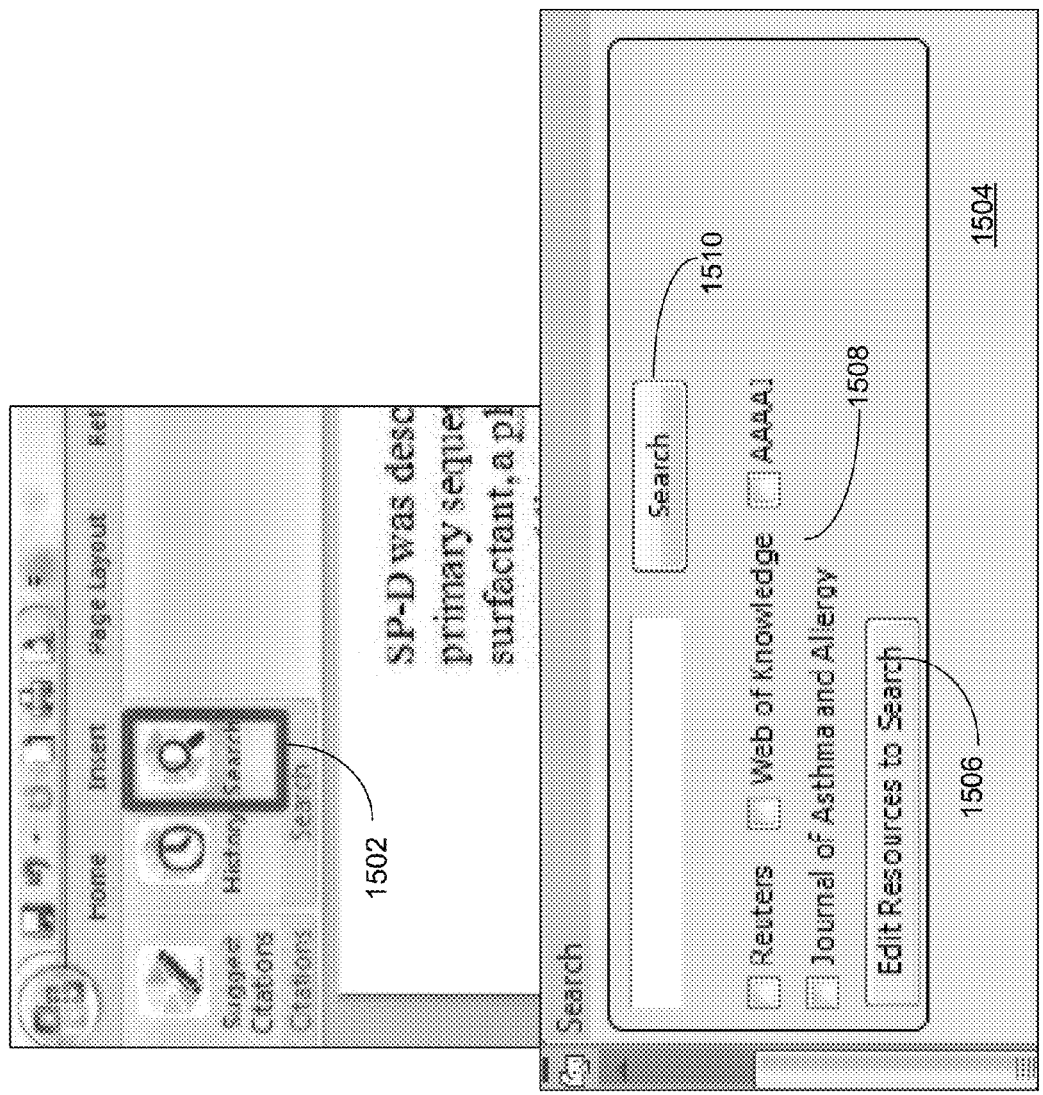
FIG. 15 is a user word processor document processing screen having a word processor plug-in in conjunction with the present invention.

FIG. 15 illustrates a Search function associated with the CRS word processor plug-in. The user selects button 1502 identified as Search in the toolbar and the system generates a dialog box 1504 or other such user interface representing an independent search capability. In this case a list of databases or resources 1508 is displayed for selection by the user by checking desired boxes and clicking on the edit resources to search button 1506. The user then types in search terms of interest and clicks the Search button 1510 to retrieve a set of responsive results. This may be an alternative input to the TAM in lieu of the highlighted text segment from the document 1200.

Figure 16:
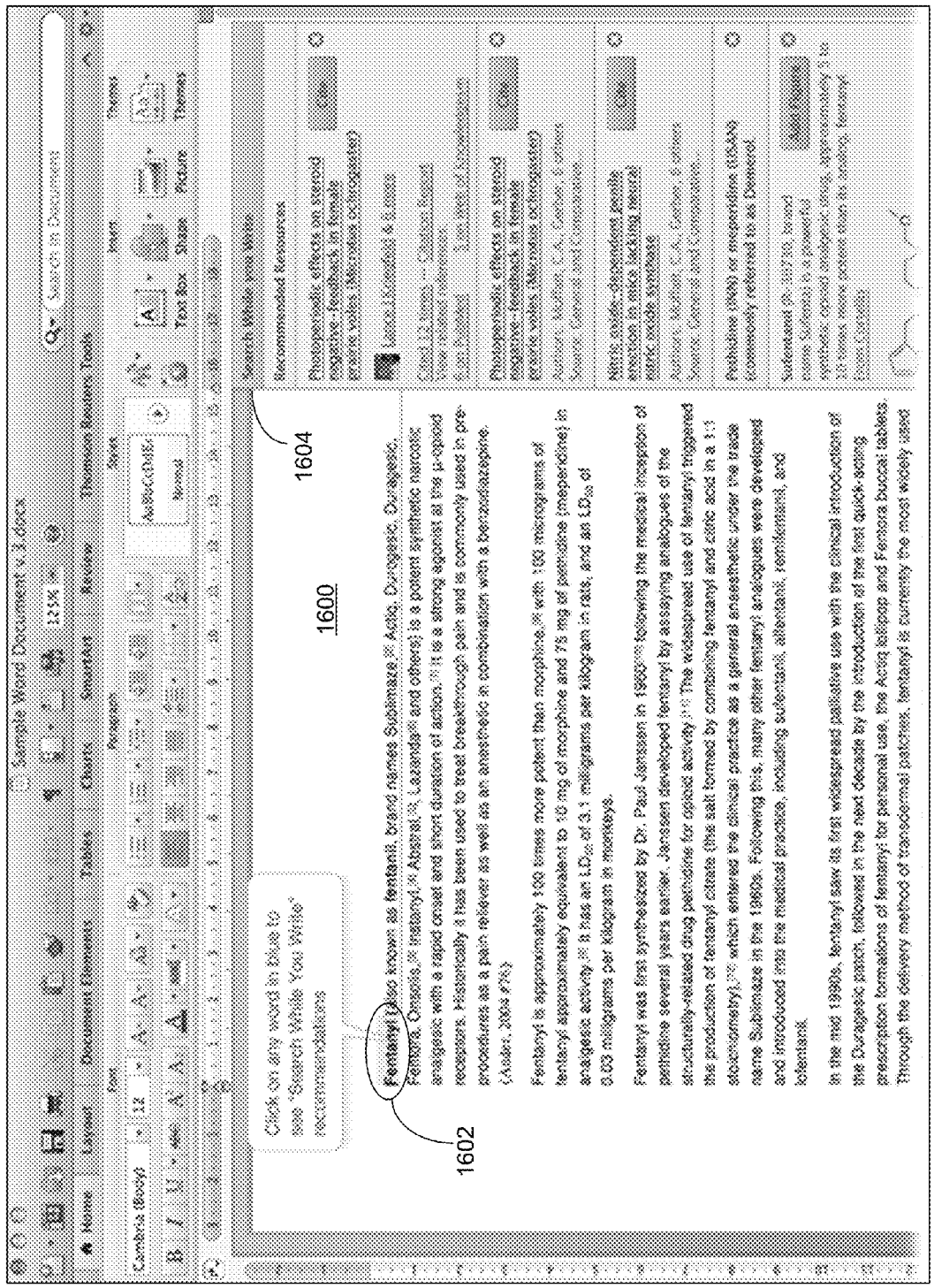
FIG. 16 is a user word processor document processing screen having a word processor plug-in in conjunction with the present invention.

FIG. 16 illustrates a further embodiment of a word processor generated document 1600 having a CRS plug-in. In this example, the system may automatically recognize certain terms appearing in document 1600, e.g., "Fentanyl," as being a term appearing in an index or otherwise representing a term highly related to a field of interest, research or study. Alternatively, the user may select the term such as by highlighting the text. In any event, the user may then engage the CRS system in a "Search While You Write" seamless manner to obtain citations or references or resources related to the term. For instance, the CRS may generate a list of recommended citations based on the term input and the user personal profile record. As shown, a list 1604 is generated and displayed for consideration and selection by the user. A selected citation may then be inserted in the document in the manner described above. Also, the system may recommend additional materials for inclusion in the document, e.g., a figure illustrating the chemical compound. The user may also select or filter the results to show the most recently published papers or documents on the subject of interest.

Figure 17:
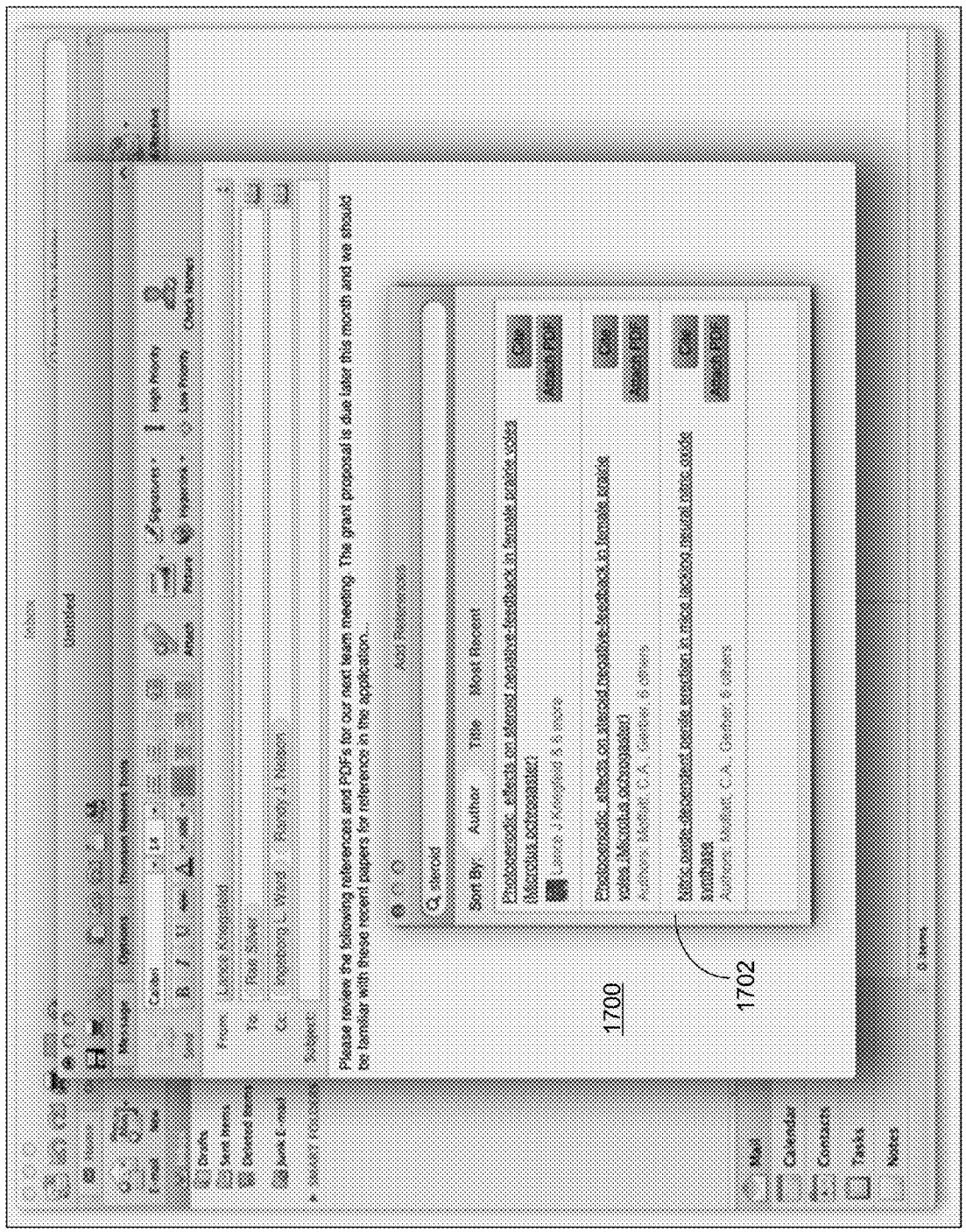
FIG. 17 is a user email processing screen having an email plug-in in conjunction with the present invention.

FIG. 17 illustrates functionality associated with an email or communication plug-in whereby citations recommended by the CRS may be forwarded via email to a recipient for consideration. The email 1700 may include a list 1702 of recommended citations and include links to documents associated with the citations and to insert the citation into a document being edited by the recipient. For example, a researcher on a team working on a common project may use the CRS to generate a list of recommended citations related to text segments of a paper and may forward the results to other team members for review and consideration and comment. The system may be used to forward newly cited papers for consideration and/or citing.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-based system comprising processor, memory, and machine readable code stored in memory and executable by processor for providing a citation recommendation, the system comprising:
   a. a text analysis module adapted to generate a first output based at least in part on a text segment, the first output being a data representation for identifying citations related to terms contained within the text segment;
   b. a personal profile module adapted to receive as an input the first output and generate a second output based at least in part on the first output, the second output being a data representation for identifying citations related to a personal profile, and wherein the personal profile module is further adapted to monitor user interaction and to store usage related data and for associating a first set of usage related data with a particular user and a first personal profile record associated with the particular user; and
   c. a recommendation module responsive to the first output and the second output and being adapted to generate a set of citation recommendation data.

2. The system of claim 1, wherein the recommendation module generates a third output comprising the set of citation recommendation data, which data includes at least one citation, and wherein the third output is adapted to be communicated to a client device for processing the set of citation recommendation data and for presenting for display a representation of the at least one citation.

3. The system of claim 2 further comprising an input for receiving a signal from the client device, the signal comprising a selection associated with the set of citation recommendation data.

4. The system of claim 2 further comprising an input for receiving a signal from the client device, the signal comprising a selection of text that is processed by the text analysis module in arriving at the first output.

5. The system of claim 2 wherein the text analysis module, the personal profile module, and the recommendation module include functional components residing and executed on one or more of a local client device and a central server.

6. The system of claim 2, wherein the client device is capable of operating under a user account associated with a personal profile record and wherein the personal profile module recognizes the user account and generates the second output based at least in part on data contained in the personal profile record.

7. The system of claim 1 further comprising a word processing integration module adapted to integrate the text analysis module, the personal profile module, and the recommendation module with a word processor application.

8. The system of claim 7 wherein the word processing integration module comprises a plug-in module for installation on a local client processing device and wherein the plug-in module is adapted to integrate the text analysis module, the personal profile module, and the recommendation module.

9. The system of claim 8 further comprising an activation module capable of initiating operation of the plug-in module.

10. The system of claim 8, wherein the local client processing device is adapted to present a graphical user interface comprising a user selection element and adapted to process a user selection associated with the set of citation recommendation data.

11. The system of claim 10, wherein the word processor application is capable of operating on the local client processing device and the local client processing device is adapted to process the received user selection and to automatically include a citation associated with the selection into a document operated by the word processor.

12. The system of claim 8, wherein the local client processing device includes an electronic user dashboard or web portal page comprising at least two discrete areas comprising one or more of the following:
   a. search citation recommendation;
   b. search parameters;
   c. search database or resource selection or filter;
   d. user activity;
   e. document or project related data;
   f. collaborator activity;
   g. grant or funding related data;
   h. project timeline or management workflow;
   i. data filtering criteria;
   j. search history.

13. The system of claim 7 wherein the word processing integration module is adapted to process a selecting, highlighting or indicating by a user of a text segment within a document operating in the word processor, the text analysis module adapted to receive and process the user selected text segment, the first output being based at least in part on the text segment.

14. The system of claim 1 wherein the text analysis module has an input, the input adapted to receive a set of text associated with a word processor document.

15. The system of claim 1 wherein the set of citation recommendation data is output for presentation to a local client device and the text analysis module has an input adapted to receive a user selection of at least one recommended citation from the set of citation recommendation data for inserting the selected recommended citation in a word processor document.

16. The system of claim 1 further comprising an authority database module adapted to interface with a set of at least one authority database.

17. The system of claim 16, wherein the set of at least one authority database includes one or more of the following:
   a. a set of full-text files;
   b. a set of meta-data records;
   c. a set of links connecting database elements; and
   d. a set of links to external source databases.

18. The system of claim 16, wherein the set of at least one authority database includes at least one of the following databases: Web of Science, Web of Knowledge, National Library of Medicine PubMed, CrossRef, BIOSIS, Dialog, library OPACS, Medline, ProQuest, Ovid, Ebsco, WilsonWeb, and a journal-configured external database.

19. The system of claim 16 further adapted to present a user interface and to receive an input representing a user selection of one or more authority database for searching based on text analysis.

20. The system of claim 1 wherein the recommendation module is further adapted to generate at least one of the following:
   a. a list of one or more recommended references or reference citations;
   b. a list of one or more recommended search results or saved queries; and
   c. a system response requesting input from the user.

21. The system of claim 1 wherein the personal profile module associates a personal profile record with a first user and has an input, the input being associated with at least one of the following:
   a. a set of first user publications;
   b. a set of first user search terms;
   c. a set of grants or similar funding sources;
   d. a set of first user search results or saved queries;
   e. a set of items stored in a personal reference library associated with the first user;
   f. a set of stored history of user-system interactions associated with the first user;
   g. a set of personal or professional biographical data elements of the first user; and
   h. a set of personal or professional biographical data elements of other system users associated or connected with the first user.

22. The system of claim 1 wherein the second output is one or more of the following:
   a. a list of one or more recommended references or citations from a user's personal reference library;
   b. a list of one or more recommended references or citations from at least one authority database; and
   c. a list of one or more recommended references or citations from other system user's personal reference libraries.

23. The system of claim 1 further comprising a communication module adapted to communicate the citation recommendation to a destination application.

24. The system of claim 1 further comprising an electronic mail module adapted to communicate a reference, citation or document containing a citation.

25. The system of claim 1 further comprising a tool integration module adapted to integrate with at least one reference tool and to receive citation data pertaining to at least one citation from the at least one reference tool, the set of citation recommendation comprising at least some data from the received citation data.

26. The system of claim 1 further comprising a clustering module.

27. The system of claim 1 further comprising a disambiguation module.

28. The system of claim 1 wherein the text analysis module receives a text segment and processes the received text segment against a search collection.

29. The system of claim 1 further comprising a user dashboard interface adapted to present to a user information pertaining to a personal profile associated with a user account.

30. The system of claim 1 further comprising a user feedback module adapted to receive a signal derived from a user input related to a user evaluation of the set of citation recommendation data, the user input being other than selecting a citation from the set of citations for including in the document.

31. A computer-implemented method for providing a citation recommendation, the method comprising:
   a. receiving and analyzing a text segment and generating a first output based at least in part on the text segment, the first output being a data representation for identifying citations related to terms contained within the text segment;
   b. analyzing data associated with a personal profile, the data comprising information gathered by monitoring user interaction and storing usage related data and associating a first set of usage related data with a particular user and a first personal profile record associated with that particular user, receiving as an input the first output and generating a second output based in part on the first output, the second output being a data representation for identifying citations related to the personal profile; and
   c. receiving and analyzing the first output and the second output and generating a set of citation recommendation data based at least in part on the first and second outputs.

32. The method of claim 31 further comprising generating a third output comprising the set of citation recommendation data, which data includes at least one citation, and communicating the third output to a client device for processing the set of citation recommendation data and for presenting for display a representation of the at least one citation.

33. The method of claim 32 further comprising receiving a signal from the client device, the signal comprising a selection associated with the set of citation recommendation data.

34. The method of claim 32 further comprising receiving a signal from the client device, the signal comprising a selection of text that is processed by the text analysis module in arriving at the first output.

35. The method of claim 32, wherein the client device is operating under a user account associated with a personal profile record and further comprising recognizing the user account and generating the second output based at least in part on data contained in the personal profile record.

36. The method of claim 31 further comprising a word processing integration module adapted to integrate the text analysis module, the personal profile module, and the recommendation module with a word processor application.

37. The method of claim 32, further comprising generating a graphical user interface comprising a user selection element and adapted to process a user selection associated with the set of citation recommendation data.

38. The method of claim 37 further comprising processing a received user selection and automatically inserting a citation associated with the selection into a document operated by a word processor.

39. The method of claim 31 further comprising generating for presenting at a local client processing device an electronic user dashboard or web portal page comprising at least two discrete areas comprising one or more of the following:
   a. search citation recommendation;
   b. search parameters;
   c. search database or resource selection or filter;
   d. user activity;
   e. document or project related data;
   f. collaborator activity;
   g. grant or funding related data;
   h. project timeline or management workflow;
   i. data filtering criteria; and
   j. search history.

40. The method of claim 31 further comprising processing a signal associated with a selecting, highlighting or indicating by a user of a text segment within a document operating in a word processor, the first output being based at least in part on the text segment.

41. The method of claim 31 further comprising receiving a set of text associated with a word processor document.

42. The method of claim 31 further comprising outputting the set of citation recommendation data for presenting at a local client device and receiving a user selection of at least one recommended citation from the set of citation recommendation data for inserting the selected recommended citation in a word processor document.

43. The method of claim 31 further comprises interfacing with a set of at least one authority database to confirm the set of citation recommendation data.

44. The method of claim 43, wherein the set of at least one authority database includes one or more of the following:
   a. a set of full-text files;
   b. a set of meta-data records;
   c. a set of links connecting database elements; and
   d. a set of links to external source databases.

45. The method of claim 43, wherein the set of at least one authority database includes at least one of the following databases: Web of Science, Web of Knowledge, National Library of Medicine PubMed, CrossRef, BIOSIS, Dialog, library OPACS, Medline, ProQuest, Ovid, Ebsco, WilsonWeb, and a journal-configured external database.

46. The method of claim 43 further comprising generating a user interface for presenting at a local client device and receiving an input representing a user selection of one or more authority database.

47. The method of claim 31 wherein the set of citation recommendation data comprises at least one of the following:
   a. a list of one or more recommended references or reference citations;
   b. a list of one or more recommended search results or saved queries; and
   c. a system response requesting input from the user.

48. The method of claim 31 further comprising associating a personal profile record with a first user, the personal profile comprising at least one of the following:
   a. a set of first user publications;
   b. a set of first user search terms;
   c. a set of grants or similar funding sources;
   d. a set of first user search results or saved queries;
   e. a set of items stored in a personal reference library associated with the first user;
   f. a set of stored history of user-system interactions associated with the first user;
   g. a set of personal or professional biographical data elements of the first user; and
   h. a set of personal or professional biographical data elements of other system users associated or connected with the first user.

49. The method of claim 31 wherein the second output is one or more of the following:
   a. a list of one or more recommended references or citations from a user's personal reference library;
   b. a list of one or more recommended references or citations from at least one authority database; and
   c. a list of one or more recommended references or citations from other system user's personal reference libraries.

50. The method of claim 31 further comprising a communicating the set of citation recommendation data to a destination application.

51. The method of claim 31 further comprising processing data from a received text segment to disambiguate terms contained within the text segment.

52. The method of claim 31 further comprising providing a hyperlink between an in-text citation within the document and a corresponding citation in a bibliography of citations.

53. The method of claim 31 further comprising automatically processing a text segment to generate the first output, the text segment being determined based on a marker placed within a word processor document.

54. The method of claim 53 wherein the text segment includes text appearing before the marker and text appearing after the marker.

* * * * *